US012327540B2

(12) United States Patent
Isozaki et al.

(10) Patent No.: US 12,327,540 B2
(45) Date of Patent: Jun. 10, 2025

(54) REPRODUCTION CONTROL METHOD, REPRODUCTION CONTROL SYSTEM, AND REPRODUCTION CONTROL APPARATUS

(71) Applicant: YAMAHA CORPORATION, Hamamatsu (JP)

(72) Inventors: Yoshimasa Isozaki, Hamamatsu (JP); Akira Maezawa, Hamamatsu (JP); Shinya Koseki, Fukuroi (JP)

(73) Assignee: YAMAHA CORPORATION, Hamamatsu (JP)

( * ) Notice: Subject to any disclaimer, the term of this patent is extended or adjusted under 35 U.S.C. 154(b) by 808 days.

(21) Appl. No.: 17/388,424

(22) Filed: Jul. 29, 2021

(65) Prior Publication Data

US 2022/0036866 A1 Feb. 3, 2022

(30) Foreign Application Priority Data

Jul. 31, 2020 (JP) ................................ 2020-130237
Oct. 14, 2020 (JP) ................................ 2020-173419

(51) Int. Cl.
*G10H 1/36* (2006.01)
*G10G 1/00* (2006.01)
*G10H 1/00* (2006.01)

(52) U.S. Cl.
CPC ................. *G10H 1/36* (2013.01); *G10G 1/00* (2013.01); *G10H 1/0008* (2013.01);
(Continued)

(58) Field of Classification Search
CPC ...... G10H 1/36; G10H 1/0008; G10H 1/0033; G10H 2210/076; G10H 2220/106; G10G 1/00
See application file for complete search history.

(56) References Cited

U.S. PATENT DOCUMENTS

2017/0256246 A1 9/2017 Maezawa
2017/0337910 A1 11/2017 Maezawa
(Continued)

FOREIGN PATENT DOCUMENTS

CN 107430848 A 12/2017
CN 111052223 A 4/2020
(Continued)

OTHER PUBLICATIONS

Office Action issued in Japanese Appln. No. 2020-173419, mailed Jul. 9, 2024. English machine translation provided.
(Continued)

*Primary Examiner* — Jianchun Qin
(74) *Attorney, Agent, or Firm* — ROSSI, KIMMS & McDOWELL LLP

(57) ABSTRACT

A computer-implemented reproduction control method includes reproducing sound from sound data representing a series of sounds including first sound and second sound that follows the first sound. The method includes starting reproducing the first sound, continuing the reproduction of a first sound until an end of the first sound in response to receiving a first instruction in a reproduction period of the first sound, stopping the reproduction of the first sound, and after the stopping of the reproduction of the first sound, starting reproducing the second sound in response to receiving a second instruction provided by a user.

14 Claims, 9 Drawing Sheets

(52) U.S. Cl.
CPC ..... *G10H 1/0033* (2013.01); *G10H 2210/076* (2013.01); *G10H 2220/106* (2013.01)

(56) References Cited

U.S. PATENT DOCUMENTS

| | | | | |
|---|---|---|---|---|
| 2018/0018957 | A1 * | 1/2018 | Hamano ................ | G10H 7/008 |
| 2020/0193948 | A1 * | 6/2020 | Maezawa ................ | G06F 9/542 |

FOREIGN PATENT DOCUMENTS

| | | | |
|---|---|---|---|
| JP | 2003091279 | A | 3/2003 |
| JP | 2016099512 | A | 5/2016 |
| JP | 2017207615 | A | 11/2017 |

OTHER PUBLICATIONS

Office Action issued in Chinese Appln. No. 202110864660.4, mailed on Dec. 13, 2024. English machine translation provided.

* cited by examiner

FIG. 1
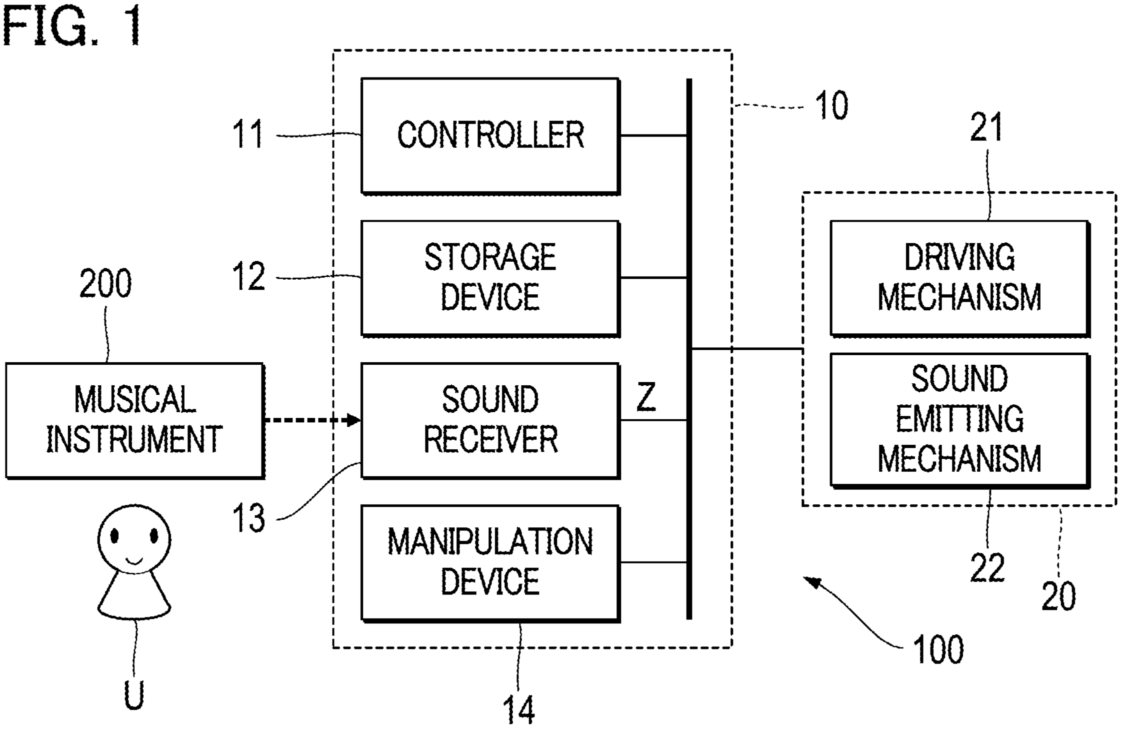
FIG. 2
MUSIC DATA M
| | |
|---|---|
| REFERENCE DATA R | PLAY PART |
| PERFORMANCE DATA D | REPRODUCTION PART |
FIG. 3
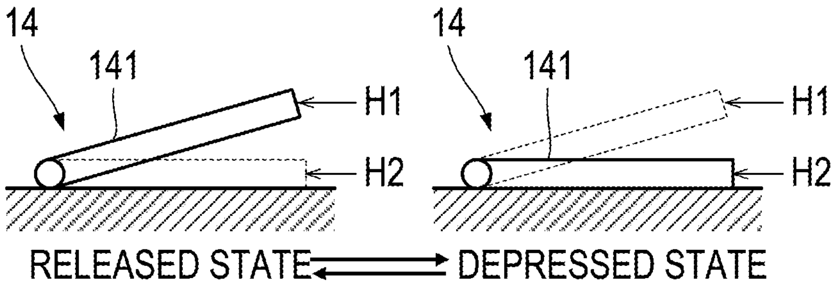

REPRODUCTION CONTROL METHOD, REPRODUCTION CONTROL SYSTEM, AND REPRODUCTION CONTROL APPARATUS

CROSS-REFERENCE TO RELATED APPLICATIONS

This application is based on and claims priority from Japanese Patent Application No. 2020-130237, filed on Jul. 31, 2020, and Japanese Patent Application No. 2020-173419, filed on Oct. 14, 2020, the entire contents of each of which are incorporated herein by reference.

BACKGROUND

Technical Field

The present disclosure relates to a technique for controlling reproduction of sounds.

Background Information

There has been proposed a technique of reproducing sounds in a piece of music represented by sound data to follow the piece of music being played by a human player. For example, Japanese Patent Application Laid-Open Publication No. 2017-207615 discloses a technique of estimating a play position in a piece of music by analyzing sounds produced by a musical instrument that is being played, and controlling automatic reproduction of a sound in the piece of music in accordance with an estimation result.

When playing a piece of music, a player may temporarily pause for expression, for example when interpreting a musical symbol such as fermata placed over a rest or bar mark. A duration of a pause may vary between players and performances. Thus, in reproducing a sound in a piece of music based on sound data, difficulty may arise in controlling an interval between two consecutive sounds that occur prior and subsequent to a pause by the player.

SUMMARY

In view of the circumstances described above, an object of one aspect according to the present disclosure is to appropriately control an interval between two sounds that occur one after another in reproduction of sound.

In one aspect, a computer-implemented reproduction control method of reproducing sound from sound data representing a series of sounds including first sound and second sound that follows the first sound includes starting reproducing the first sound, continuing the reproduction of a first sound until an end of the first sound in response to receiving a first instruction in a reproduction period of the first sound, stopping the reproduction of the first sound, and after the stopping of the reproduction of the first sound, starting reproducing the second sound in response to receiving a second instruction provided by a user.

In another aspect, a computer-implemented reproduction control method of reproducing a series of sounds, including first sound and second sound that follows the first sound, of a piece of music represented by sound data includes estimating a temporal position of part of the piece of music being played by a user in conjunction with reproduction of the series of sounds of the piece of music being reproduced, and reproducing the series of sounds following playing of the piece of music by the user based on a result of the estimation. The reproduction of the series of sounds includes: starting reproducing the first sound, stopping the reproduction of the first sound in response to receiving a first instruction in a reproduction period of the first sound, and after stopping of the reproduction of the first sound, starting reproducing the second sound in response to a second instruction from the user.

In still another aspect, a computer-implemented reproduction control method includes obtaining sound data representative of a series of sounds including a first sound, starting reproducing the first sound, and continuing the reproduction of the first sound until an end of the first sound in response to receiving an instruction in a reproduction period of the first sound. The instruction is generated in accordance with a manipulation of a manipulation device by a user.

BRIEF DESCRIPTION OF THE DRAWINGS

FIG. 1 is a block diagram illustrating a configuration of a reproduction system according to a first embodiment;

FIG. 2 is a schematic diagram of music (track) data;

FIG. 3 is an explanatory diagram showing a configuration and state of a manipulation device;

DETAILED DESCRIPTION

A: First Embodiment

Figure 4:
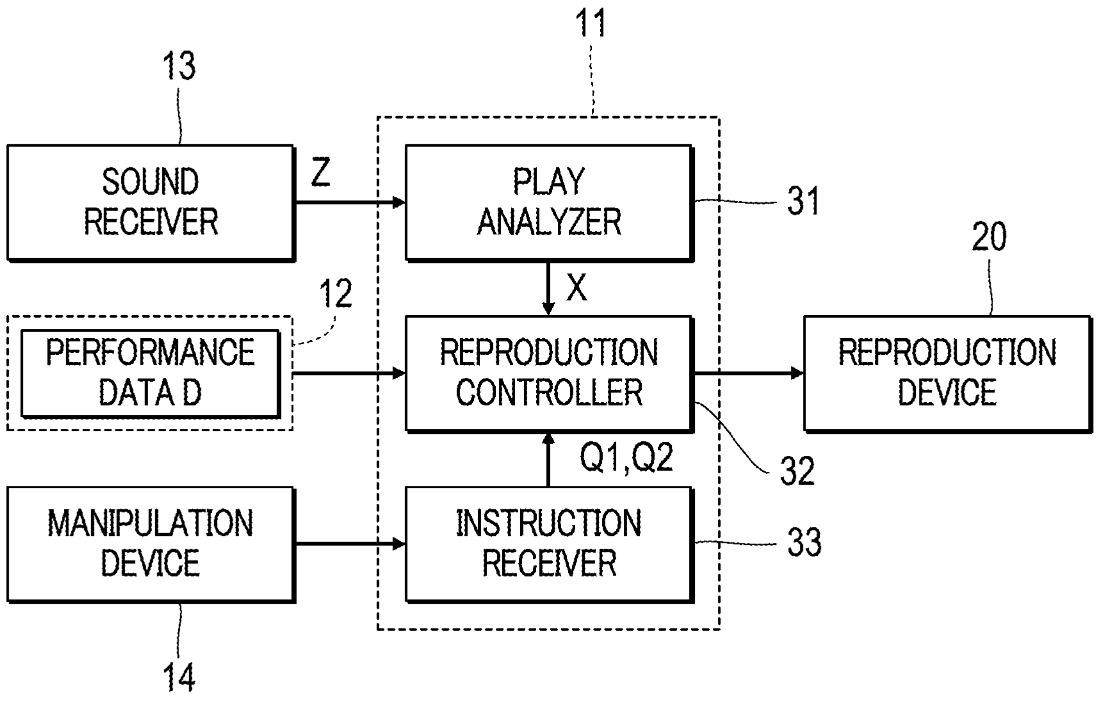
FIG. 4 is a block diagram illustrating a functional configuration of a reproduction control system.

FIG. 1 is a block diagram illustrating a configuration of a reproduction system 100 according to a first embodiment. The reproduction system 100 is installed in a space where a user U is present. The user U is a player who plays a specific part of a piece of music (hereinafter, "play part") using a musical instrument 200 such as a string instrument. The reproduction system 100 includes a computer system that reproduces music sounds associated with the play part of the piece of music in conjunction with playing of the play part by the user U. Specifically, the reproduction system 100 reproduces a part (hereinafter, "reproduction part") of the piece of music. The reproduction part is different from the play part. The play part is, for example, a melody part of the piece of music. The reproduction part is, for example, an accompaniment part of the piece of music. As will be understood from the above explanation, performance of the piece of music is realized by the playing of the play part by the user U and the reproduction of the reproduction part by the reproduction system 100 in conjunction with each other. The play part and the reproduction part may be parts that are common to each other in the piece of music.

The reproduction system 100 includes a reproduction control system 10 and a reproduction device 20. The reproduction control system 10 and the reproduction device 20 are separate from each other, and communicate either by wire or wirelessly. The reproduction control system 10 and the reproduction device 20 may be formed to be integral.

The reproduction device 20 reproduces the reproduction part of the piece of music under control of the reproduction control system 10. Specifically, the reproduction device 20 includes an automatic musical instrument that plays the reproduction part automatically. For example, the reproduction device 20 includes an automatic musical instrument (for example, an automatic player piano), which is different in kind from the musical instrument 200 played by the user U. As will be understood from the above explanation, automatic playing is one form of "reproduction."

The reproduction device 20 according to the first embodiment includes a driving mechanism 21 and a sound emitting mechanism 22. The sound emitting mechanism 22 includes a mechanism that emits musical sounds. Specifically, the sound emitting mechanism 22, as in a natural keyboard instrument, includes a strike mechanism that produces a sound from a string (a sounding source) by striking the string upon depressing a key of a keyboard. The driving mechanism 21 drives the sound emitting mechanism 244 to automatically reproduce sounds of the piece of music. The driving mechanism 21 drives the sound emitting mechanism 22 responsive to an instruction from the reproduction control system 10, whereby the reproduction part is automatically reproduced.

The reproduction control system 10 includes a computer system that controls the reproduction of the reproduction part by the reproduction device 20. The reproduction control system 10 includes a controller 11, a storage device 12, a sound receiver 13, and a manipulation device 14. The reproduction control system 10 may be realized by a portable terminal device such as a smartphone or a tablet terminal, by a stationary terminal device such as a personal computer, or by a combination of devices.

The controller 11 includes one or more processors that control each element of the reproduction control system 10. Specifically, the controller 11 includes one or more types of processors such as a Central Processing Unit (CPU), a Sound Processing Unit (SPU), a Digital Signal Processor (DSP), a Field Programmable Gate Array (FPGA), or an Application Specific Integrated Circuit (ASIC).

The storage device 12 includes one or more memories that store a program executed by the controller 11 and various pieces of data used by the controller 11. The storage device 12 includes a known recording medium such as a magnetic recording medium or a semiconductor recording medium, or a combination of a plurality of kinds of recording media. The storage device 12 may be a portable recording medium that is detachable from the reproduction control system 10. The storage device 12 may be a recording medium that is writable and/or readable by a computer via a communication network (for example, a cloud storage server).

The storage device 12 stores music data M representative of a series of notes that constitute the piece of music. FIG. 2 is a schematic diagram of the music data M. The music data M includes reference data R and performance data D. The reference data R represents a series of notes in the play part to be played by the user U. Specifically, the reference data R represents a pitch and a sounding period for each of the notes in the play part. The performance data D represents a series of notes in the reproduction part to be reproduced by the reproduction device 20. Specifically, the performance data D represents a pitch and a sounding period for each of the notes in the reproduction part. Each of the reference data R and the performance data D is a series of pieces of data in the format of a Musical Instrument Digital Interface (MIDI), for example. Each of the reference data R and the performance data D includes a series of pieces of indication data and a series of pieces of temporal data. The indication data indicates sounding (producing of a sound) and muting for each of the sounds corresponding to the notes. The temporal data specifies a time point of each of motions, such as the sounding and the muting for each of the sounds, indicated by the indication data. The indication data indicates the motions by specifying, for example, a pitch and volume of each of the sounds. The temporal data specifies an interval between two consecutive pieces of indication data, for example. The sounding period with regard to a note representative of a specific pitch is a period from a first time point to a second time point. The first time point is a time point at which producing of a sound corresponding to the note is indicated by a piece of indication data. The second time point is a time point at which muting of the sound corresponding to the note representative of the specific pitch is indicated by a piece of indication data subsequent to the piece of indication data that indicates the producing of the sound. The performance data D is an example of "sound data" representative of a series of sounds. A plurality of the notes in the reproduction part represented by the performance data D is an example of "a series of a plurality of sounds" or "a plurality of sounds" represented by the "sound data."

The sound receiver 13 in FIG. 1 receives the sounds emitted from the musical instrument 200 played by the user U to generate an audio signal Z representative of a waveform of the sounds. For example, the sound receiver 13 includes a microphone. The audio signal Z generated by the sound receiver 13 is converted from an analog signal to a digital signal by an A/D converter (not shown). The first embodiment illustrates a configuration in which the sound receiver 13 is installed in the reproduction control system 10. However, the sound receiver 13 may be separate from the reproduction control system 10 and may be connected to the reproduction control system 10 either by wire or wirelessly. The reproduction control system 10 may receive, as the audio signal Z, a signal supplied from an electric musical instrument such as an electric string instrument. As will be understood from the above explanation, the sound receiver 13 may be omitted from the reproduction control system 10.

The manipulation device 14 is an input device that receives instructions from the user U. As is shown in FIG. 3, the manipulation device 14 according to the first embodiment includes a movable member 141 that moves responsive to manipulation by the user U. The movable member 141 includes a pedal operable by a foot of the user U. For example, the manipulation device 14 includes a pedal-type MIDI controller. Accordingly, the user U is able to manipulate the manipulation device 14 at a desired time point while playing the musical instrument 200 with both hands. The manipulation device 14 may be a touch panel that detects a touch on the touch panel by the user U.

The state of the manipulation device 14 is shifted from one of two states, a released state and a depressed state, responsive to manipulation by the user U. The released state is a state in which the manipulation device 14 is not manipulated by the user U. Specifically, the released state is a state in which the movable member 141 is not depressed by the user U. The released state may be expressed as a state in which the movable member 141 is at a position H1. The depressed state is a state in which the manipulation device 14 is manipulated by the user U. Specifically, the depressed state is a state in which the movable member 141 is depressed by the user U. The depressed state may be expressed as a state in which the movable member 141 is at a position H2 different from the position H1. The released state is an example of a "first state," and the depressed state is an example of a "second state."

FIG. 4 is a block diagram illustrating a functional configuration of the reproduction control system 10. The controller 11 executes the program stored in the storage device 12, thereby realizing functional elements (a play analyzer 31, a reproduction controller 32, and an instruction receiver 33) for controlling the reproduction of the reproduction part by the reproduction device 20.

The play analyzer 31 analyzes the audio signal Z supplied from the sound receiver 13 to estimate a play position X in the piece of music. The play position X is a temporal position of a part currently being played by the user U within the piece of music. The play position X is represented by a time point within the piece of music. The play analyzer 31 repeatedly estimates the play position X while the reproduction device 20 reproduces the reproduction part in conjunction with the playing of the play part by the user U. In other words, the play analyzer 31 estimates the play position X at each of time points on a time axis; the play position X moves forward in the piece of music over time.

Specifically, the play analyzer 31 calculates the play position X by comparing the reference data R of the music data M with the audio signal Z. The play analyzer 31 may estimate the play position X by using a known analysis technique (score alignment technique). For example, the play analyzer 31 may use the analysis technique disclosed in Japanese Patent Application Laid-Open Publication No. 2016-099512 to estimate the play position X. The play analyzer 31 may estimate the play position X by using a statistical estimation model such as a deep neural network or a hidden Markov model.

The reproduction controller 32 causes the reproduction device 20 to reproduce each of the notes represented by the performance data D. In other words, the reproduction controller 32 causes the reproduction device 20 to execute automatic performance of the reproduction part. Specifically, the reproduction controller 32 moves a position Y (hereinafter, "reproduction position Y") of a note to be reproduced from among the notes in the piece of music forward in the piece of music over time. The reproduction controller 32 supplies a piece of indication data corresponding to the reproduction position Y from among the pieces of indication data in the performance data D to the reproduction device 20. Thus, the reproduction controller 32 functions as a sequencer that sequentially supplies each piece of indication data included in the performance data D to the reproduction device 20. The reproduction controller 32 causes the reproduction device 20 to reproduce the reproduction part in conjunction with the play of the play part played by the user U.

The reproduction controller 32 causes the reproduction device 20 to reproduce the reproduction part so as to follow the play of the piece of music played by the user U in accordance with a result of the estimation of the play position X executed by the play analyzer 31. This enables the automatic reproduction of the reproduction part by the reproduction device 20 to progress at the same tempo as the tempo of the play of the play part played by the user U. For example, when the progress speed of the play position X (that is, the speed of the play performed by the user U) is fast, the reproduction controller 32 increases the progress speed of the reproduction position Y (the speed of reproduction executed by the reproduction device 20). When the progress speed of the play position X is slow, the reproduction controller 32 decreases the progress speed of the reproduction position Y. This enables the automatic reproduction of the reproduction part to be executed at the same progress speed as the progress speed of the playing by the user U such that the automatic reproduction of the reproduction part synchronizes with the movement in the play position X. Therefore, the user U can play the play part with a sense that the reproduction device 20 is reproducing the reproduction part in accompaniment with the playing by the user U.

According to the first embodiment, the reproduction of the notes in the reproduction part follows the playing of the play part played by the user U. Therefore, an intention of the user U (for example, musical expression) or a preference of the user U can be appropriately reflected in the reproduction of the reproduction part.

The instruction receiver 33 receives a first instruction Q1 and a second instruction Q2 from the user U. The first instruction Q1 and the second instruction Q2 are each provided responsive to manipulation of the manipulation device 14 by the user U. The first instruction Q1 is an instruction to temporarily stop the reproduction of the reproduction part by the reproduction device 20. The second instruction Q2 is an instruction to resume the reproduction of the reproduction part that was temporarily stopped responsive to the first instruction Q1.

Specifically, the instruction receiver 33 receives the first instruction Q1 as a result of the user U manipulating the manipulation device 14 to cause it to shift from the released state to the depressed state. By stepping on the movable member 141 of the manipulation device 14, the user U provides the first instruction Q1 to the reproduction control system 10.. For example, the instruction receiver 33 determines a time point when the movable member 141 starts to move from the position H1 (the released state) toward the position H2 (the depressed state) as a time point of provision of the first instruction Q1. The instruction receiver 33 may determine a time point when the movable member 141 reaches a point mid-way between the position H1 and the position H2 as the time point of the provision of the first instruction Q1. The instruction receiver 33 may determine a time point when the movable member 141 reaches the position H2 as the time point of the provision of the first instruction Q1.

The instruction receiver 33 receives the second instruction Q2 as a result of the user U manipulating the manipulation device 14 to cause it to shift from the depressed state to the released state. By releasing the movable member 141 of the manipulation device 14 from the state in which the movable member 141 depressed, the user U provides the second instruction Q2 to the reproduction control system 10. For example, the instruction receiver 33 determines a time point when the movable member 141 starts to move from the position H2 (the depressed state) toward the position H1 (the released state) as a time point of provision of the second instruction Q2. The instruction receiver 33 may determine a time point when the movable member 141 reaches a point mid-way between the position H2 and the position H1 as the time point of the provision of the second instruction Q2. The instruction receiver 33 may determine a time point when the movable member 141 reaches the position H1 as the time point of the provision of the second instruction Q2.

The user U can provide the first instruction Q1 and the second instruction Q2 at any time point during the playing of the play part. Therefore, the user U can change an interval between the time point of the provision of the first instruction Q1 and the time point of the provision of the second instruction Q2. For example, the user U provides the first instruction Q1 before starting a rest period in the piece of music, and provides the second instruction Q2 after a rest period of a duration desired by the user U has passed.

Figure 5:
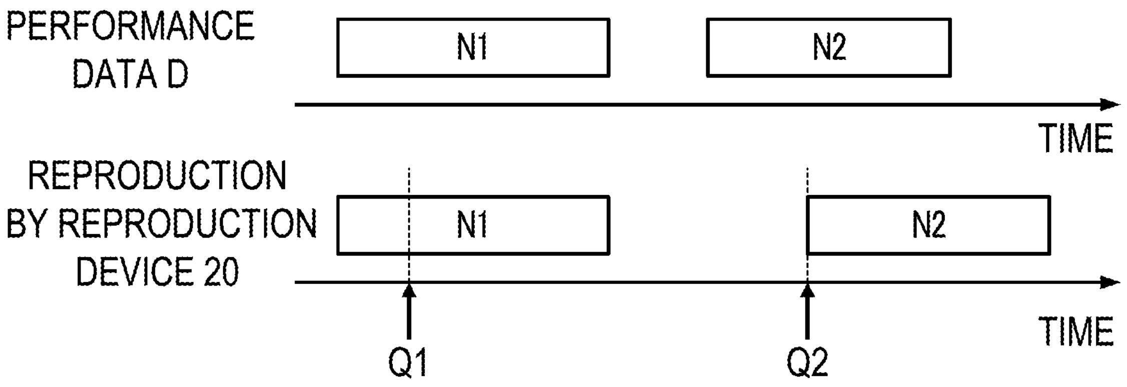
FIG. 5 is an explanatory diagram showing a relationship between a reproduction of a reproduction part by a reproduction device, a first instruction, and a second instruction.

FIG. 5 is an explanatory diagram showing a relationship between the reproduction of the reproduction part by the reproduction device 20, the first instruction Q1, and the second instruction Q2. Both a sounding period of each note represented by the performance data D and a sounding period of each note to be reproduced by the reproduction device 20 are described in FIG. 5.

Each of notes N1 in FIG. 5 is included in the notes represented by the performance data D. The note N1 is a note associated with the first instruction Q1. Specifically, the note N1 is included in the notes in the reproduction part. The note N1 is a note that is reproduced by the reproduction device 20 at the time of the provision of the first instruction Q1. When the first instruction Q1 is provided by the user U, the reproduction controller 32 causes the reproduction device 20 to continue to reproduce the note N1 until the end of the sounding period of the note N1 represented by the performance data D. For example, the reproduction controller 32 supplies the indication data indicating the muting of the note N1 to the reproduction device 20 at the end of the sounding period of the note N1. As will be understood from the above explanation, the reproduction of the note N1 does not stop immediately upon provision by the user U of the first instruction Q1, but rather continues after provision of the first instruction Q1 until the end represented by the performance data D. The note N1 is an example of a "first sound."

Each of notes N2 in FIG. 5 is included in the notes represented by the performance data D. The note N2 is a note subsequent to the note N1. The reproduction controller 32 causes the reproduction device 20 to start to reproduce the note N2 in response to the provision of the second instruction Q2 by the user U after stopping the reproduction of the note N1. Thus, the reproduction of the note N2 starts in response to the provision of the second instruction Q2 but not in relation to a starting point of the sounding period of the note N2 represented by the performance data D or the duration of the interval between the note N1 and the note N2 represented by the performance data D. Specifically, the reproduction controller 32 supplies the indication data on the note N2 in the performance data D to the reproduction device 20 when the instruction receiver 33 receives the second instruction Q2. Accordingly, the reproduction of the note N2 is started immediately after the provision of the second instruction Q2. The note N2 is an example of a "second sound."

Figure 6:
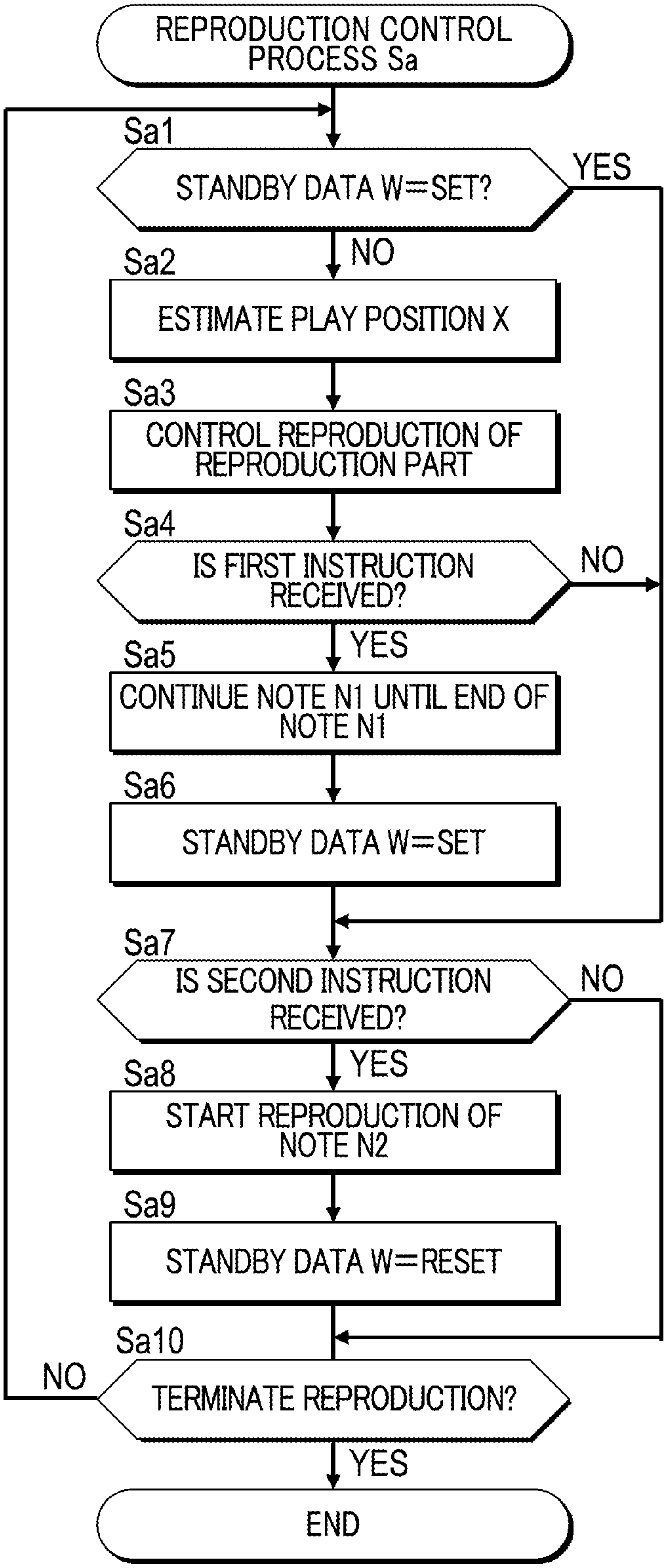
FIG. 6 is a flowchart illustrating a specific procedure of a reproduction control process.

FIG. 6 is a flowchart illustrating a specific procedure of an operation Sa executed by the controller 11 to control the reproduction device 20 (hereinafter, "reproduction control process"). The reproduction control process Sa is started upon receipt of an instruction from the user U.

When the reproduction control process Sa starts, the controller 11 determines whether standby data W is set (Sa1). The standby data W is data (for example, a flag) indicating that the reproduction of the reproduction part, namely note N2, has been temporarily stopped due to the provision of the first instruction Q1. The standby data W is stored in the storage device 12. Specifically, the standby data W is set (for example, set to W=1) at step Sa6 when the first instruction Q1 is provided at step Sa4. The standby data W is reset (for example, reset to W=0) at step Sa9 when the second instruction Q2 is provided at step Sa7. In other words, the standby data W indicates a state in which the controller 11 waits for the start of the reproduction of the reproduction part.

When the standby data W is reset (Sa1: NO), the controller 11 (the play analyzer 31) analyzes the audio signal Z supplied from the sound receiver 13 to estimate the play position X (Sa2). The controller 11 (the reproduction controller 32) causes the reproduction device 20 to reproduce the reproduction part in accordance with the result of the estimation of the play position X (Sa3). In other words, the controller 11 controls the reproduction of the reproduction part by the reproduction device 20 to follow the playing of the play part played by the user U.

The controller 11 (the instruction receiver 33) determines whether the first instruction Q1 is received from the user U (Sa4). When the first instruction Q1 is received (Sa4: YES), the controller 11 (the reproduction controller 32) causes the reproduction device 20 to continue to reproduce the note N1 that is being reproduced when the first instruction Q1 is provided, until the end of the sounding period of the note N1 represented by the performance data D (Sa5). Specifically, the controller 11 causes the reproduction position Y to proceed at the same progress speed (tempo) as the progress speed of the reproduction position Y at the time point when the first instruction Q1 is provided. When the reproduction position Y reaches the end of the sounding period of the note N1, the controller 11 supplies the indication data indicating the muting of the note N1 to the reproduction device 20. After execution of the above processes, the controller 11 sets the standby data W (W=1) (Sa6). Before Step Sa5, the standby data W (Sa6) may be updated.

When the standby data W is set, the determination result at Step Sa1 becomes affirmative. When the standby data W is set (Sa1: YES), the estimation of the play position X (Sa2), the reproduction control of the reproduction part (Sa3), and processes for the note N1 (Sa4 to Sa6) are not executed. In other words, the reproduction control of the reproduction part linked with the play position X is stopped in response to receipt of the first instruction Q1 from the user U. When the first instruction Q1 is not received (Sa4: NO), the processes for the note N1 (Sa5 and Sa6) are not executed.

The controller 11 (the instruction receiver 33) determines whether the second instruction Q2 is received from the user U (Sa7). When the second instruction Q2 is received (Sa7: YES), the controller 11 (the reproduction controller 32) causes the reproduction device 20 to reproduce the note N2 subsequent to the note N1 (Sa8). Specifically, the controller 11 sets the reproduction position Y to the starting point of the note N2. In other words, the reproduction of the reproduction part that has been stopped as a result of receipt of the first instruction Q1 is resumed as a result of receipt of the second instruction Q2. The controller 11 resets the standby data W (W=0) (Sa9). As described above, when the standby data W is reset, the determination result at Step Sa1 becomes negative. Therefore, the estimation of the play position X (Sa2) and the reproduction control of the reproduction part (Sa3) are resumed in response to receipt of the second instruction Q2. The standby data W (Sa9) may be updated before Step Sa8.

The controller 11 determines whether to terminate the reproduction of the reproduction part by the reproduction device 20 (Sa10). For example, when the reproduction is complete up to the end of the reproduction part, or when the user U indicates termination of the reproduction, the controller 11 determines termination of the reproduction of the reproduction part. When the controller 11 determines continuation of the reproduction of the reproduction part (Sa10: NO), the controller 11 moves the process to Step Sa1 to repeat the processes described above (Sa1 to Sa9). On the other hand, when the controller 11 determines termination of the reproduction of the reproduction part (Sa10: YES), the reproduction control process Sa is completed.

As described above, according to the first embodiment, the note N1 associated with the first instruction Q1 received from the user U is reproduced, the reproduction of the note N1 is then stopped, and the reproduction of the note N2 subsequent to the note N1 is then started in response to the second instruction Q2 received from the user U. The interval between the period of the reproduction of the note N1 and the period of the reproduction of the note N2 (for example, the duration of the rest period in the piece of music) may vary based on each of time points including the time point of the provision of the first instruction Q1 and the time point of the provision of the second instruction Q2.

In the first embodiment, the reproduction of the note N1 being reproduced at the time of the provision of the first instruction Q1 continues until the end of the note N1 represented by the performance data D even after the provision of the first instruction Q1. This enables the reproduction of the note N1 to appropriately continue in accordance with the performance data D, as compared with a configuration in which the reproduction of the note N1 stops at the time of the provision of the first instruction Q1.

In the first embodiment, the manipulation of the manipulation device 14 by the user U can change the interval between the note N1 and the note N2 to an interval having an appropriate duration in accordance with an intended preference of the user U. Particularly in the first embodiment, the first instruction Q1 is provided in response to a shift of the manipulation device 14 from the released state to the depressed state, with the depressed state being maintained, and then the second instruction Q2 is generated in response to a shift of the manipulation device 14 from the depressed state to the released state at a desired time point after the provision of the first instruction Q1. In other words, the first instruction Q1 and the second instruction Q2 are generated responsive to manipulations by which the released state is shifted to the depressed state and then the depressed state is shifted to the released state. Therefore, as compared with a configuration in which the manipulation for shifting the manipulation device 14 from the released state to the depressed state is required for each of the first instruction Q1 and the second instruction Q2, the manipulation of the manipulation device 14 by the user U is simplified.

B: Second Embodiment

A second embodiment will now be described. In each example illustrated below, elements having functions identical to those in the first embodiment are denoted by like reference signs as used in the descriptions in the first embodiment, and detailed explanations of such elements are omitted, as appropriate.

In the first embodiment, responsive to the provision of the first instruction Q1, the reproduction position Y progresses at the same progress speed as the progress speed of the reproduction position Y at the time point when the first instruction Q1 is provided. The reproduction of the note N1 stops when the reproduction position Y reaches the end of the note N1. The reproduction controller 32 according to the second embodiment changes the progress speed of the reproduction position Y (that is, the progress speed of the reproduction of the reproduction part) after the provision of the first instruction Q1 in accordance with a manipulation velocity V1 of the manipulation of the movable member 141. The manipulation velocity V1 is a velocity of the movable member 141 that moves from the position H1 corresponding to the released state toward the position H2 corresponding to the depressed state. For example, the manipulation velocity V1 is an average of velocities of the movable member 141 calculated during a period in which the movable member 141 moves from the position H1 to the position H2.

Figure 7:
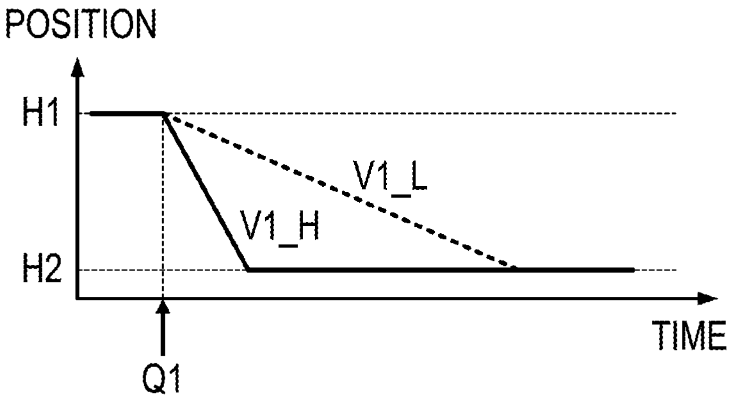
FIG. 7 is an explanatory diagram showing a state of a manipulation device according to a second embodiment.

FIG. 7 is an explanatory diagram showing the state of the manipulation device 14 in the second embodiment. As illustrated in FIG. 7, the instruction receiver 33 receives the first instruction Q1 at the time point when the movable member 141 starts to move from the position H1 toward the position H2. The reproduction controller 32 controls the progress speed of the reproduction position Y after the provision of the first instruction Q1 in accordance with the manipulation velocity V1 of the manipulation of the movable member 141.

Specifically, the reproduction controller 32 increases the progress speed of the reproduction position Y when the manipulation velocity V1 is fast. For example, as illustrated in FIG. 7, the progress speed of the reproduction position Y at the time point when the manipulation velocity V1 is the velocity V1_H is faster than the progress speed of the reproduction position Y at the time point when the manipulation velocity V1 is the velocity V1_L (V1_L<V1_H). Therefore, the duration of the note N1 is reduced as the manipulation velocity V1 becomes faster. For example, the duration of the note N1 in a situation in which the manipulation velocity V1 is the velocity V1_H is shorter than the duration of the note N1 in a situation in which the manipulation velocity V1 is the velocity V1_L.

The second embodiment can obtain the same effects as those of the first embodiment. The second embodiment has an advantage in that the user U can adjust the duration of the note N1, since the duration of the note N1 is controlled in accordance with the manipulation velocity V1. In the second embodiment, the manipulation device 14 for providing the first instruction Q1 and the second instruction Q2 is also used for adjustment of the duration of the note N1. Therefore, the second embodiment has an advantage in that the user U can carry out operations with ease compared to a configuration in which the user U operates a device to adjust the duration of the note N1 in addition to a device to provide the first instruction Q1 and the second instruction Q2.

C: Third Embodiment

In the first embodiment, the reproduction of the note N2 is started immediately after the provision of the second instruction Q2. In the third embodiment, a time from the time point of the provision of the second instruction Q2 to the time point of starting the reproduction of the note N2 (hereinafter, "delay time") varies in accordance with a manipulation velocity V2. The manipulation velocity V2 is a velocity of the movable member 141 that moves from the position H2 corresponding to the depressed state toward the position H1 corresponding to the released state. For example, the manipulation velocity V2 is an average of velocities of the movable member 141 calculated during a period in which the movable member 141 moves from the position H2 to the position H1.

Figure 8:
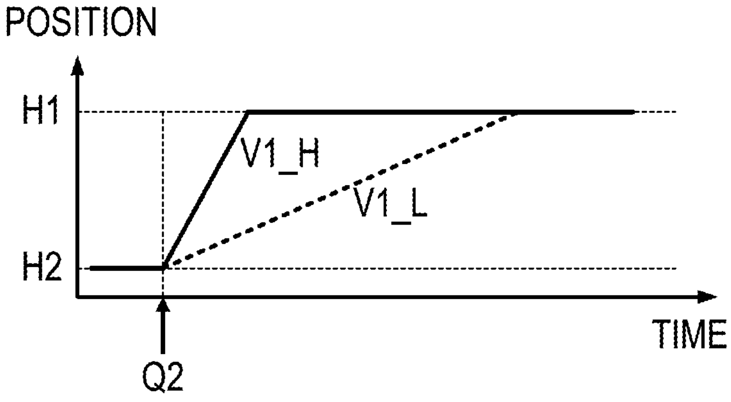
FIG. 8 is an explanatory diagram showing a state of a manipulation device according to a third embodiment.

FIG. 8 is an explanatory diagram showing the state of the manipulation device 14 in the third embodiment. As illustrated in FIG. 8, the instruction receiver 33 receives the second instruction Q2 at the time point when the movable member 141 starts to move from the position H2 toward the position H1. The reproduction controller 32 changes a delay time of the time point of reproducing the Note N2 in accordance with the manipulation velocity V2.

Specifically, since the manipulation velocity V2 is fast, the reproduction controller 32 reduces the delay time. For example, as illustrated in FIG. 8, the delay time in a situation in which the manipulation velocity V2 is the velocity V2_L is longer than the delay time in a situation in which the manipulation velocity V2 is the velocity V2_H (V2_H>V2_L). Therefore, when the reproduction of the note N2 is delayed, the time point on a time axis as the manipulation velocity V2 becomes slower.

The third embodiment can obtain the same effects as those of the first embodiment. The third embodiment has an advantage in that the user U can adjust a starting point of the first note N2 in a situation in which the reproduction of the reproduction part is resumed, since the time point when the reproduction of the note N2 starts is controlled in accordance with the manipulation velocity V2. In the third embodiment, the manipulation device 14 for providing the first instruction Q1 and the second instruction Q2 is also used for adjusting the starting point of the note N2. Therefore, the third embodiment has an advantage in that the user U can carry out operations with ease as compared with a configuration in which the user U operates a device for adjusting the starting point of the note N2 in addition to a device for providing the first instruction Q1 and the second instruction Q2. The configuration of the second embodiment may be applied to the third embodiment.

D: Fourth Embodiment

Figure 9:
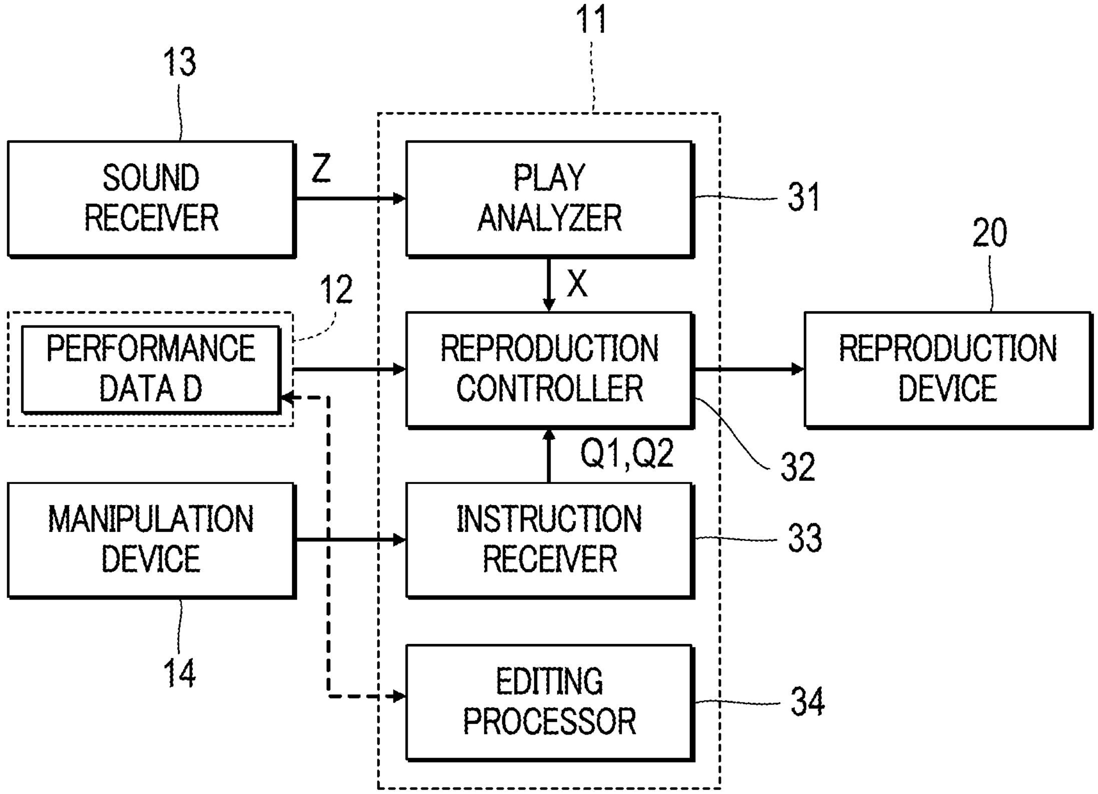
FIG. 9 is a block diagram illustrating a functional configuration of a reproduction control system according to a fourth embodiment.

FIG. 9 is a block diagram illustrating a functional configuration of the reproduction control system 10 according to a fourth embodiment. The controller 11 in the fourth embodiment functions as an editing processor 34 in addition to the same elements as those of the first embodiment (the play analyzer 31, the reproduction controller 32, and the instruction receiver 33). The editing processor 34 edits the performance data D stored in the storage device 12 in response to an instruction received from the user U. Operations of elements other than the editing processor 34 are identical to those of the first embodiment. Therefore, the fourth embodiment can obtain the same effects as those of the first embodiment. The configuration of the second or third embodiment may be applied to the fourth embodiment.

Figure 10:
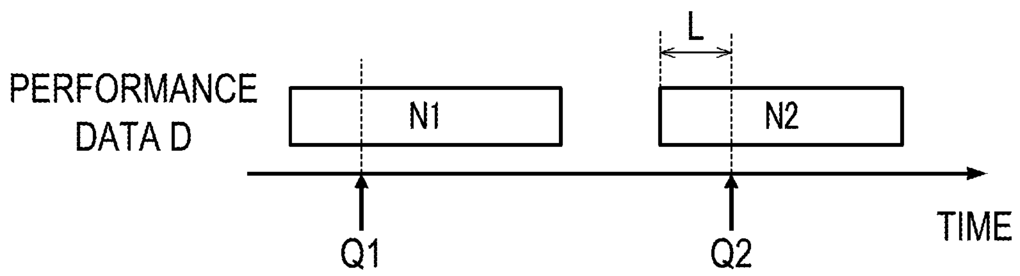
FIG. 10 is an explanatory diagram showing an operation of an editing processor.

FIG. 10 is an explanatory diagram showing an operation of the editing processor 34. FIG. 10 illustrates the note N1 and the note N2 represented by the reproduction part in the performance data D. As in the embodiments described above, the first instruction Q1 and the second instruction Q2 may be provided at any time point by the user U. Therefore, a time difference L exists between the starting time point of the note N2 represented by the performance data D and a time point when the second instruction Q2 is provided. The editing processor 34 determines the length of the time difference L by subtracting the starting time point of the note N2 from the time point when the second instruction Q2 is provided. The editing processor 34 edits the performance data D to reduce the time difference L.

Figure 11:
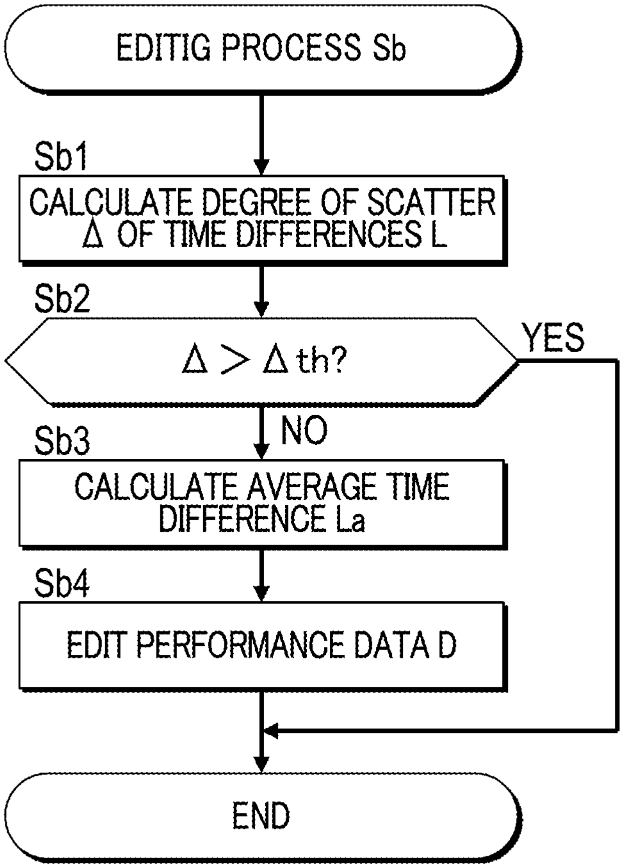
FIG. 11 is a flowchart illustrating a specific procedure of an editing process.

FIG. 11 is a flowchart illustrating a specific procedure of a process Sb executed by the editing processor 34 to edit the performance data D (hereinafter, "editing process"). The reproduction device 20 reproduces the reproduction part (the reproduction control process Sa described above) a predetermined number of times. The editing process Sb is executed each time the reproduction device 20 reproduces the reproduction control process Sa. The editing process Sb may be started upon receipt of an instruction from the user U.

When the editing process Sb starts, the editing processor 34 calculates a degree of scatter Δ of the time differences L in the reproduction control processes Sa executed the predetermined number of times (Sb1). The degree of scatter Δ is a statistical value that is representative of a degree of scatter relative to the time differences L. The degree of scatter Δ may be variance of the time differences L, a standard deviation of the time differences L, a distribution range of the time differences L, or the like.

The editing processor 34 determines whether the degree of scatter Δ is greater than a threshold Δth (Sb2). When the degree of scatter Δ is greater than the threshold Δth, it is assumed that the user U is practicing the piece of music and intentionally changes a waiting time from the time point of completing the reproduction of the note N1 to the time point of starting the reproduction of the note N2. Therefore, it is not appropriate to edit the performance data D in accordance with the time differences L when the degree of scatter Δ is greater than the threshold Δth. When the degree of scatter Δ is less than the threshold Δth, it is assumed that the time differences L are numerical values that reflect the intention of the user U or the preference of the user U (that is, values particular to the user U).

Therefore, the editing processor 34 edits the performance data D in accordance with the time differences L (Sb3 to Sb4) when the degree of scatter Δ is less than the threshold Δth (Sb2: NO). When the degree of scatter Δ is greater than or equal to the threshold Ath (Sb2: YES), the editing processor 34 terminates the editing process Sb without editing the performance data D (Sb3 and Sb4).

To edit the performance data D, the editing processor 34 calculates an average time difference La by averaging the time differences L (Sb3). The editing processor 34 changes the start point of the note N2 represented by the performance data D by the average time difference La (Sb4). For example, when the average time difference La is a negative value, the editing processor 34 moves the start point of the note N2 represented by the performance data D backward by a time corresponding to the average time difference La. When the average time difference La is a positive value, the editing processor 34 delays the start point of the note N2 represented by the performance data D by the time corresponding to the average time difference La. In other words, the start point of the note N2 represented by the performance data D is delayed when the user U has a sufficient waiting time immediately before the note N2. The start point of the note N2 represented by the performance data D is moved forward when the user U has only a short waiting time.

As will be understood from the above explanation, in the fourth embodiment, the performance data D is edited in accordance with the time difference L in the playing of the play part played by the user U. Accordingly, playing tendencies of different users U can be reflected in the performance data D.

E: Fifth Embodiment

Figure 12:
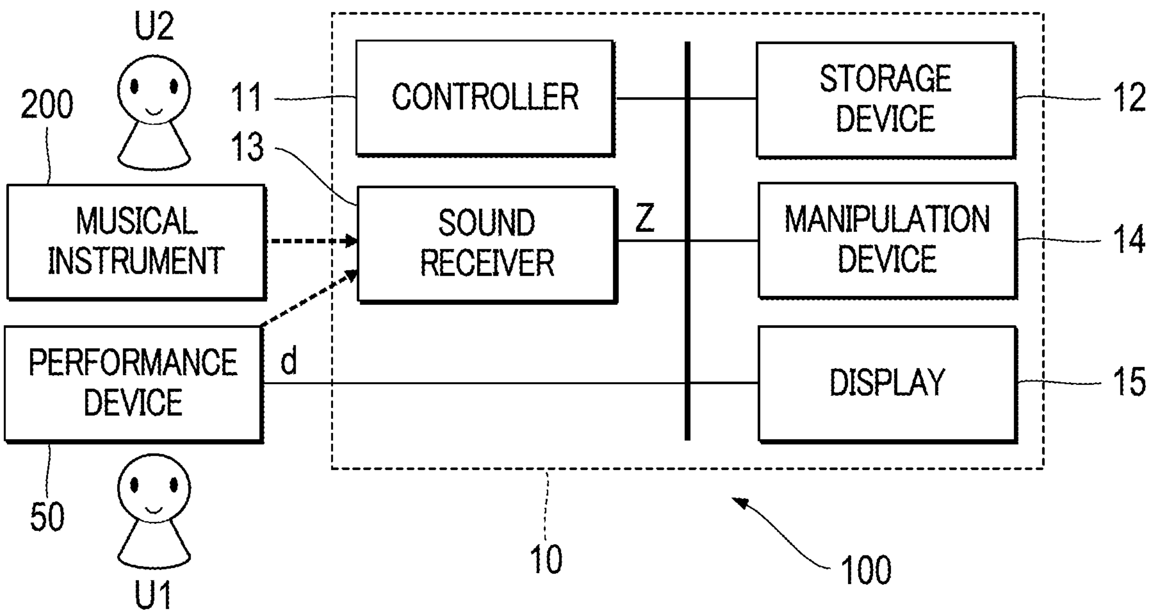
FIG. 12 is a block diagram illustrating a configuration of a reproduction system according to a fifth embodiment.

FIG. 12 is a block diagram illustrating a configuration of a reproduction system 100 according to a fifth embodiment. The reproduction system 100 includes a reproduction control system 10 and a performance device 50. The reproduction control system 10 in the fifth embodiment includes a display 15 in addition to the same elements as those of the reproduction control system 10 in the first embodiment (the controller 11, the storage device 12, the sound receiver 13, and the manipulation device 14). The display 15 displays an image indicated by the controller 11. The display 15 is, for example, a liquid crystal display panel or an organic electro luminescence (OEL) display panel.

The performance device 50 is an automatic performance instrument that functions not only as a reproduction device that automatically reproduces the reproduction part in the piece of music but also as a musical instrument that can be played in a conventional manner, i.e., manually played by the user U1. Specifically, similarly to the reproduction device 20 described above, the performance device 50 includes the driving mechanism 21 and the sound emitting mechanism 22. The performance device 50 in the fifth embodiment may be used in place of the reproduction device 20 in the first to fourth embodiments.

The user U1 plays the performance device 50 by way of body movement such as moving her/his fingers to depress and release keys on a keyboard. The performance device 50 is able to produce sounds of a piece of music by operating dependent on the playing of the piece of music by the user U1. The performance device 50 sequentially supplies to the reproduction control system 10 pieces of indication data d indicative of instructions corresponding to the playing by the user U. The pieces of indication data d are supplied in conjunction with the playing by the user U1. The indication data d indicates, for example, a pitch and a loudness of a sound, to specify a motion such as production of a sound or muting of the sound. On the other hand, the user U2 plays the musical instrument 200. The musical instrument 200 is a conventional musical instrument such as a string instrument played by the user U2.

Figure 13:
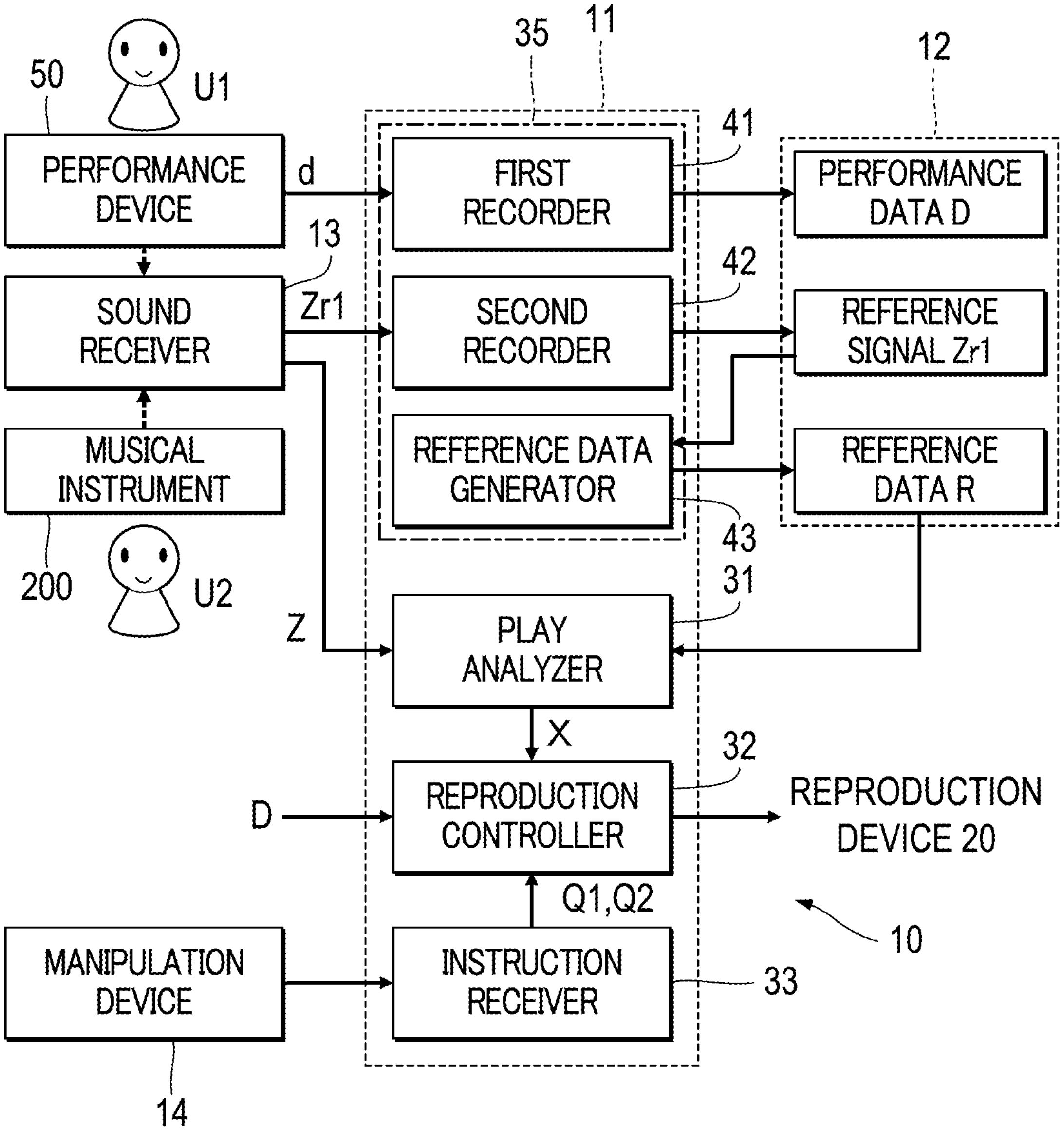
FIG. 13 is a block diagram illustrating a functional configuration of a reproduction control system according to the fifth embodiment.

FIG. 13 is a block diagram illustrating a functional configuration of the reproduction control system 10 in the fifth embodiment. The controller 11 in the fifth embodiment functions as a preparation processor 35 in addition to the same elements as those shown in the first embodiment (the play analyzer 31, the reproduction controller 32, and the instruction receiver 33) by executing a program stored in the storage device 12. The preparation processor 35 generates music data M (performance data D and reference data R) for use in the reproduction control process Sa. Specifically, the preparation processor 35 generates the music data M in accordance with both playing of the performance device 50 by the user U1 and playing of the musical instrument 200 by the user U2. The preparation processor 35 includes a first recorder 41, a second recorder 42, and a reference data generator 43.

The reference data generator 43 generates the reference data R for use in the reproduction control process Sa. Specifically, the reference data generator 43 generates the reference data R by executing a reference-data-generation process Sc (FIG. 14) before the reproduction control process Sa is started. The reference data R generated by the reference data generator 43 are stored in the storage device 12.

The user U1 and the user U2 together play a piece of music within a time period (hereinafter "preparation period") before the reference-data-generation process Sc is executed. Specifically, the user U1 plays the reproduction part of the piece of music with the performance device 50 in the preparation period. The user U2 plays the play part of the piece of music with the musical instrument 200 in the preparation period. The reference-data-generation process Sc is a process of generating the reference data R by using the result of the playing of the piece of music played by the user U1 in the preparation period and using the result of the playing of the piece of music played by the user U2 in the preparation period.

The first recorder 41 acquires the performance data D representative of a plurality of sounds indicated to the performance device 50 by the user U1 during the playing in the preparation period. Specifically, the first recorder 41 acquires the performance data D by generating the performance data D including both a series of pieces of the indication data d and a series of pieces of the temporal data. The pieces of indication data d are sequentially supplied from the performance device 50 to the first recorder 41 in accordance with the playing of the performance device 50 by the user U1. Each of the pieces of temporal data specifies an interval between two consecutive pieces of indication data D. The first recorder 41 stores the performance data D in the storage device 12. The performance data D stored in the storage device 12 are used for the reproduction control process Sa as described above. The performance data D acquired by the first recorder 41 may be edited by the editing processor 34 of the fourth embodiment.

The second recorder 42 acquires an audio signal Z (hereafter, "reference signal Zr1") generated by the sound receiver 13 in the preparation period. During the preparation period, the sound receiver 13 receives sounds produced by the performance device 50 played by the user U1 in addition to sounds produced by the musical instrument 200 played by the user U2. The reference signal Zr1 is a signal representative of a mixture of the sounds produced by the musical instrument 200 and the sounds produced by the performance device 50. As will be understood from the above explanation, the second recorder 42 acquires the reference signal Zr1 representative of the sounds produced by the musical instrument 200 when the piece of music is played using the musical instrument 200 (the first performance) and the sounds produced by the performance device 500 when the piece of music is played with the performance instrument 500. The second recorder 42 stores the reference signal Zr1 in the storage device 12. As will be understood from the above explanation, the performance data D and the reference signal Zr1 are stored in the storage device 12 in the preparation period.

The reference data generator 43 generates reference data R by executing the reference-data-generation process Sc using the reference signal Zr1 acquired by the second recorder 42. In the embodiments described above, MIDI data including a series of pieces of the indication data and a series of pieces of the temporal data is given as an example of the reference data R. The reference data R in the fifth embodiment is data representative of a playing period, a sounding time point, and a pitch transition in the piece of music. The playing period is a period during which the user U2 plays the musical instrument 200 in the preparation period. The playing period is also referred to as a period in which the musical instrument 200 produces sounds. For example, the reference data R specifies the time of the start point of the playing period and the time of the end point of the playing period. The sounding time point is a time point at which each sound starts in the piece of music played by the user U2. That is, the sounding time point is a time point of the onset of each of the sounds of the piece of music. For example, the reference data R represents a time at which each sound is to be produced. The pitch transition is a series of pitches of the sounds produced by the musical instrument 200 played by the user U1 in the preparation period.

Figure 14:
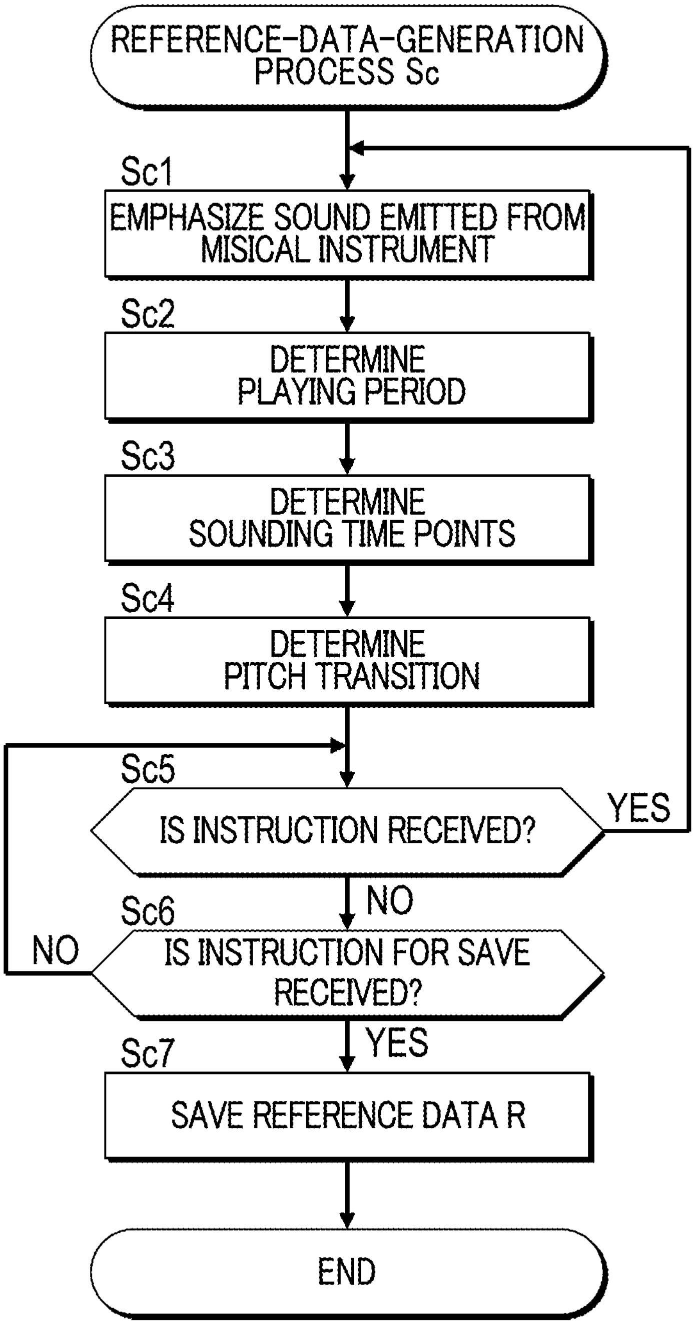
FIG. 14 is a flowchart illustrating a specific procedure of a reference-data-generation process.

FIG. 14 is a flowchart illustrating a specific procedure of the reference-data-generation process Sc. After the performance data D and the reference signal Zr1 in the preparation period are acquired, the reference-data-generation process Sc is initiated in response to an instruction sent from the user U (U1, U2) to the manipulation device 14, for example.

When the reference-data-generation process Sc starts, the reference data generator 43 emphasizes audio components that represent the sounds emitted from the musical instrument 200 in the reference signal Zr1, to generate a reference signal Zr2 (Sc1). The reference signal Zr1 includes audio components representative of the sounds produced by the performance device 50 and audio components representative of the sounds produced by the musical instrument 200. The reference data generator 43 generates the reference signal Zr2 by reducing the audio components representative of the sounds produced by the performance device 50 from the reference signal Zr1.

For example, the reference data generator 43 generates the reference signal zr2 by subtracting from an amplitude spectrogram of the reference signal Zr1 an amplitude spectrogram representative of the sounds produced by the performance device 50. The amplitude spectrogram representative of the sounds produced by the performance device 50 is generated by executing, for example, a process including both a known sound generation process for generating an audio signal representative of the sounds specified by the performance data D, and a frequency analysis process such as a process of performing discrete Fourier transforms on the audio signal generated in the known sound generation process. Subtraction of the amplitude spectrogram representative of the sounds produced by the performance device 50 is adjusted in accordance with an instruction from the user U sent to the manipulation device 14.

The process of generating the reference signal Zr2 from the reference signal Zr1 is not limited to the above example. For example, the audio components representative of the sounds produced by the musical instrument 200 in the reference signal Zr1 may be emphasized by using a known sound-source-separation technique. Furthermore, in a case, for example, that the sounds emitted from the performance device 50 scarcely reach the sound receiver 13, step Sc1 may be omitted. The embodiment without step Sc1 executes the following processes on the reference signal Zr1 instead of the reference signal Zr2. The reference signal Zr1 and the reference signal Zr2 are examples of the "first audio signal."

Figure 15:
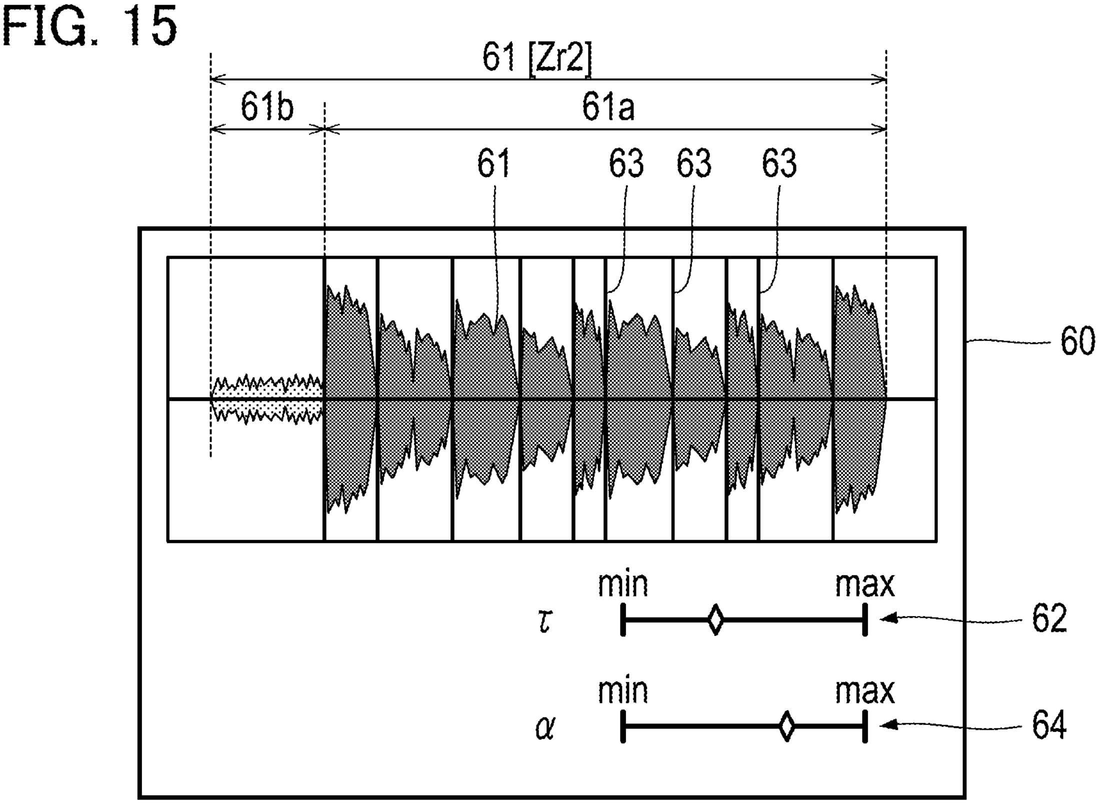
FIG. 15 is a schematic view illustrating a preparation image displayed in a period during which a reference data generation process is executed.

The controller 11 causes the display 15 to display a preparation image 60, as shown in FIG. 15, in conjunction with the reference-data-generation process Sc. The preparation image 60 is a waveform 61 that is representative of the reference signal Zr2. The user U can adjust the range of the reference signal Zr2 displayed in the preparation image 60 by manipulating the manipulation device 14.

As illustrated in FIG. 14, the reference data generator 43 determines one or more playing periods in the reference signal Zr2 by analyzing the reference signal Zr2 (Sc2). To determine the one or more playing periods, the reference data generator 43 uses a first Hidden Markov Model (HMM) that estimates the one or more playing periods in accordance with the intensity of the reference signal Zr2. The reference data generator 43 determines, as the one or more playing periods, one or more periods in which the intensity of the reference signal Zr2 is greater than a threshold T. The method of determining the one or more playing periods is not limited to the example described above.

The preparation image 60 represents the one or more playing periods determined based on the reference signal Zr2. Specifically, as illustrated in FIG. 15, the controller 11 arranges portions 61*a* and 61*b* of the waveform 61 of the reference signal Zr2 in the preparation image 60. The portion 61*a* is a waveform of the reference signal Zr2 in one playing period. The portion 61*b* is a waveform of the reference signal Zr2 in a period different from the playing period. The portions 61*a* and 61*b* are displayed to have a different appearance. Here, "appearance" refers to properties of an image that can be visually discriminated by an observer. For example, "appearance" includes a pattern or shape in addition to three attributes of color, namely, hue (tone), saturation, and lightness (gradation). The method of displaying the one or more playing periods is not limited to the examples described above.

Furthermore, the preparation image 60 includes a manipulation image 62 that can be manipulated by the user U via the manipulation device 14. The reference data generator 43 adjusts a threshold T used to determine one or more playing periods in accordance with an instruction from the user U sent to the manipulation image 62. As the threshold T set by the user U becomes smaller, each time point in the reference signal Zr2 is more likely to be determined as a time point in the one or more playing periods.

The reference data generator 43 determines a plurality of sounding time points in the reference signal Zr2 by analyzing the reference signal Zr2 (Sc3). As illustrated in FIG. 15, the preparation image 60 includes indicator images 63. The indicator images 63 represent the sounding time points determined based on the reference signal Zr2 respectively. The indicator images 63 are vertical lines at respective sounding time points on the time axis. However, the specific mode of the indicator image 63 is not limited to the example described above.

The reference data generator 43 determines a sounding time point by using a second HMM including a plurality of states corresponding to different pitches. The reference data generator 43 determines, as the sound time point, a time point at which one state transitions to a different state (that is, the time points at which the pitch changes). In accordance with an instruction from the user U for a type of the musical instrument 200, the reference data generator 43 may limit a range of transitions between different states in the second HMM (that is, a range of pitch variation) to a range of the musical instrument 200. That is, transition to a state corresponding to a pitch outside the range of the musical instrument 200 is prevented.

A first transition matrix $\Lambda$1 and a second transition matrix $\Lambda$2 are set for each of the different states in the second HMM. The first transition matrix $\Lambda$1 for each state is a matrix that defines a first transition probability (a self-transition probability) and a second transition probability. The first transition probability represents a transition probability to the respective state, and the second transition probability represents a transition probability to a state different from the respective state. The second transition matrix $\Lambda 2$ for each state is a matrix that defines a third transition probability (a self-transition probability) and a fourth transition probability. The third transition probability represents a transition probability to the respective state, and the fourth transition probability represents a transition probability to a state different from the respective state. The transition probability defined by the first transition matrix $\Lambda 1$ for each state is different from the transition probability defined by the second transition matrix $\Lambda 2$ for the same state. Specifically, the second transition probability is less than the fourth transition probability. In other words, the first transition probability (the self-transition probability) is greater than the third transition probability (the self-transition probability). Therefore, when the first transition matrix $\Lambda 1$ is applied to the second HMM, a transition between different states in the second HMM is less likely to occur as compared with a configuration in which the second transition matrix $\Lambda 2$ is applied to the second HMM. That is, the frequency of estimating time points on the time axis as the sounding time points decreases.

A transition matrix $\Lambda$ for each of the different states is determined by calculating a weighted sum of the first transition matrix $\Lambda 1$ and the second transition matrix $\Lambda 2$. The reference data generator 43 in the fifth embodiment applies the respective transition matrix $\Lambda$ to the corresponding state in the second HMM. The transition matrix $\Lambda$ is expressed by, for example, the following Equation (1). The coefficient a in the Equation (1) is a numerical value within a range of 0 or more and 1 or less.

$$\Lambda=\alpha\cdot\Lambda 1+(1-\alpha)\cdot\Lambda 2 \quad (1)$$

As illustrated in FIG. 15, the preparation image 60 includes a manipulation image 64 that can be manipulated by the user U via the manipulation device 14. The reference data generator 43 adjusts the coefficient $\alpha$ used to determine the sounding time points in accordance with an instruction from the user U sent to the manipulation image 64. As will be understood from the Equation (1), the larger the coefficient $\alpha$, the greater the influence of the first transition matrix $\Lambda 1$ on the transition matrix $\Lambda$, and the smaller the influence of the second transition matrix $\Lambda 2$ on the transition matrix $\Lambda$. Therefore, transitions between the different states in the second HMM do not readily occur. That is, a probability of the time points in the reference signal Zr2 being determined as the sounding time points decreases. As will be understood from the above description, the larger the coefficient $\alpha$, the smaller the number of sounding time points determined based on the reference signal Zr2. In other words, the smaller the coefficient $\alpha$, the greater the number of sounding time points. The user U manipulates the manipulation image 64 while viewing the preparation image 60 to adjust the coefficient a such that the number of sounding time points displayed as the number of indicator images 63 is set to an appropriate number. The method of determining the sounding time points is not limited to the example described above.

The reference data generator 43 determines the pitch transition by analyzing the reference signal Zr2 (Sc4). The reference data generator 43 determines the pitch transition by using an estimation model, for example. The estimation model is trained by machine learning using a relationship between the frequency characteristic of the reference signal Zr2 and the pitch transition. The estimation model is a deep neural network such as a convolutional neural network or a recurrent neural network. For example, the estimation model receives control data including a spectrum generated by performing a constant Q transform on the reference signal Zr2. The estimation model generates a series of pitches (that is, the pitch transition) depending on the control data. The method of determining the pitch transition is not limited to the example described above. Furthermore, the order of the emphasis on the audio components representative of the sounds (Sc1), the determination of the playing period (Sc2), the determination of the sounding time points (Sc3), and the determination of the pitch transition (Sc4) may be freely changed. For example, the audio components representative of the sounds produced by the performance device 50 may be reduced from the reference signal Zr1 by using a numerical value calculated in the determination of the pitch transition (Sc4) (for example, a posterior probability of the pitch).

The reference data generator 43 determines whether an instruction is received from the user U (Sc5). Specifically, the reference data generator 43 determines whether the user U indicates a change in the threshold $\tau$ or the coefficient $\alpha$. Upon receipt of the instruction from the user U (Sc5: YES), the reference data generator 43 changes the threshold $\tau$ or the coefficient $\alpha$ in accordance with the instruction, and then determines the one or more playing periods, the sounding time points, and the pitch transition by executing the processes (Sc1 to Sc4) in which the changed threshold $\tau$ or the coefficient $\alpha$ is applied.

A process load for determining the sounding time points may be greater than that for determining the one or more playing periods. Therefore, the frequency of the determination of the sounding time points may be less than the frequency of the determination of the one or more playing periods. For example, the reference data generator 43 repeats the determination of the one or more playing periods (Sc2) in a period during which the user U changes the threshold $\tau$ by manipulating the manipulation image 62. For example, the determination of the one or more playing period (Sc2) is repeated in a period during which the user U drags the manipulation image 62 to change the threshold $\tau$. On the other hand, the reference data generator 43 does not determine the sounding time points in a period during which the user U changes the coefficient a by manipulating the manipulation image 64, and determines the sounding time points (Sc3) in response to the end of the change in the coefficient $\alpha$ (that is, the determination of the changed coefficient $\alpha$). For example, the sounding time points are determined when a manipulation is completed in which the user U drags the manipulation image 62 to change the coefficient $\alpha$. The above configuration has an advantage in that the process load required to determine the sounding time points is reduced while the one or more playing periods rapidly changes in response to an instruction from the user U.

When an instruction is not received from the user U (Sc5: NO), the reference data generator 43 determines whether an instruction to save the reference data R is received from the user U (Sc6). When an instruction to save the reference data R is not received (Sc6: NO), the reference data generator 43 proceeds to step Sc5. On the other hand, when the instruction to save the reference data R is received from the user U (Sc6: YES), the reference data generator 43 saves the reference data R representative of the one or more playing periods, the sounding time points, and the pitch transition at this time in the storage device 12 (Sc7).

The reference data R generated in the reference-data-generation process Sc described above is applied to the reproduction control process Sa. The specific procedure of the reproduction control process Sa in the fifth embodiment is identical to those of the embodiments described above.

For example, the play analyzer 31 compares the audio signal Z, which represents the sounds emitted from the musical instrument 200 when the user U2 plays the play part with the musical instrument 200 (a second play, that is, a second play part), with the reference data R generated by the reference-data-generation process Sc to estimate the play position X in conjunction with the second play (the second play part). Furthermore, the reproduction controller 32 causes the performance device 50 to reproduce each note of the reproduction part represented by the performance data D acquired by the first recorder 41. Specifically, the reproduction controller 32 causes the performance device 50 to reproduce each note of the reproduction part so as to follow the playing of the piece of music by the user U2 in accordance with the result of the estimation executed by the play analyzer 31.

In the above description, the single performance device 50 executes both the acquisition of the performance data D in the preparation period and the automatic performance based on the reproduction control process Sa. However, the reproduction device 20, which executes the automatic performance based on the reproduction control process Sa, may be used in addition to the performance device 50 to acquire the performance data D in the preparation period. That is, the performance device 50 need not necessarily include the automatic performance function. Furthermore, an additional musical instrument 20, which acquires the reference signal Zr1 in the preparation period, may be used in addition to the musical instrument 20 played in conjunction with the reproduction control process Sa.

Furthermore, the reproduction controller 32 as well as those of the embodiments described above continues to reproduce the note being reproduced at the time of the provision of the first instruction Q1 by the user U2 until the end of the note N1 represented by the performance data D. Furthermore, after the reproduction of the note N1 is completed, the reproduction controller 32 starts the reproduction of the note N2 subsequent to the note N1 in response to the second instruction Q2 from the user U. Therefore, the fifth embodiment can obtain the same effects as those of each of the embodiments described above.

Furthermore, the fifth embodiment generates the reference data R in accordance with a result of playing the piece of music by the user U2 using the musical instrument 200. Therefore, with regard to a piece of music for which the reference data R is not prepared, the fifth embodiment can generate the reference data R including the reflection of the play of the piece of music performed by the user U2.

Figure 16:
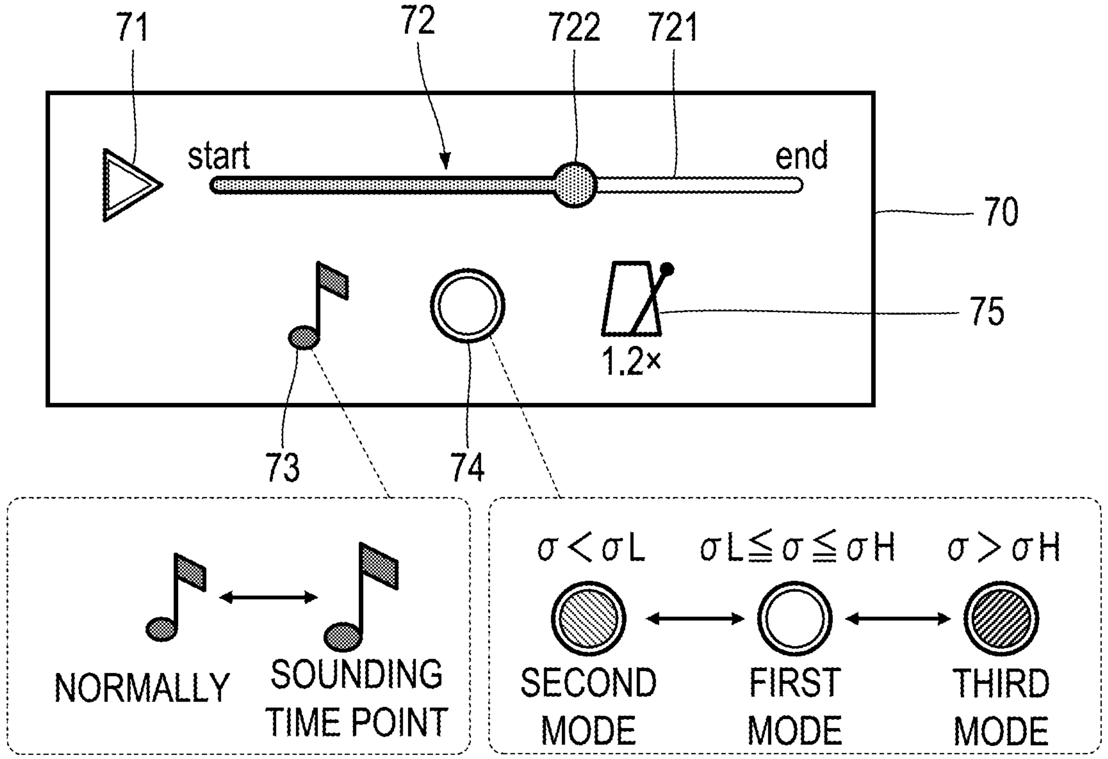
FIG. 16 is a schematic view illustrating a reproduction image displayed in a period during which a reproduction control process is executed.

The controller 11 in the fifth embodiment causes the display 15 to display a reproduction image 70 in FIG. 16 in conjunction with the reproduction control process Sa. The reproduction image 70 includes a manipulation image 71, a reproduction image 72, an indicator image 73, an indicator image 74, and a manipulation image 75.

The manipulation image 71 is an image representative of an instruction from the user U to start the automatic reproduction by the performance device 50 (the start of the reproduction control process Sa). The reproduction image 72 is an image representative of the current reproduction position Y of the performance device 50. Specifically, the reproduction image 72 includes a time axis 721 and an indicator image 722. The time axis 721 represents a section of the piece of music. The indicator image 722 represents the current reproduction position Y. The indicator image 722 moves along the time axis 721 in accordance with the progress of the automatic reproduction.

The indicator image 73 is an image for notifying the user U of the sounding time points represented by the reference data R. Specifically, the controller 11 changes a display appearance of the indicator image 73 when the reproduction position Y reaches each sounding time point represented by the reference data R. For example, the indicator image 73 rapidly widens when the reproduction position Y reaches the sounding time. The user U can confirm each sounding time point represented by the reference data R by viewing the indicator image 73. Thus, the user U can visually confirm an excess or deficiency of the sounding time points estimated by executing the reference-data-generation process Sc (that is, a suitability of the process of determining the sounding time points) with regard to the playing of the piece of music by the user U2 in the preparation period.

The indicator image 74 is an image for notifying the user U whether the volume of the sounds emitted from the musical instrument 200 is appropriate to estimate the play position X with high accuracy. When the volume σ of the sounds represented by the audio signal Z is too high or too low, the accuracy of the estimation of the play position X by the play analyzer 31 tends to reduce. Therefore, the controller 11 changes a display appearance of the indicator image 74 in accordance with the volume of the sounds represented by the audio signal Z.

Specifically, the controller 11 maintains the display appearance of the indicator image 74 in a first mode when the volume of the sounds represented by the audio signal Z is greater than or equal to a threshold σL and less than or equal to a threshold σH. The threshold σH is greater than the threshold σL. Each of the thresholds σL and σH is set based on experiment or statistics such that the play position X is estimated with a target accuracy when the volume σ of the sounds represented by the audio signal Z is in a range of the threshold σL or more and the threshold σH or less.

Furthermore, when the volume of the sounds represented by the audio signal Z is less than the threshold σL, the controller 11 changes the appearance of the indicator image 74 to a second mode different from the first mode. That is, when the volume σ of the sounds represented by the audio signal Z is too low for highly accurate estimation of the play position X, the indicator image 74 is displayed in the second mode. On the other hand, when the volume σ of the sounds represented by the audio signal Z is greater than the threshold σH, the controller 11 changes the appearance of the indicator image 74 to a third mode different from the first mode. That is, when the volume σ of the sounds represented by the audio signal Z is too high for highly accurate estimation of the play position X, the indicator image 74 is displayed in the third mode. As will be understood from the above explanation, the user U is notified of a reduction in the accuracy of the estimation of the play position X by the change in the appearance of the indicator image 74. The second mode and the third mode may be identical to each other, or may be different from each other.

In the above description, the focus is on the volume of the sounds represented by the audio signal Z. However, an index that serves as a reference for changing the appearance of the indicator image 74 is not limited to the volume of the sounds represented by the audio signal Z. For example, the controller 11 may control the appearance of the indicator image 74 in accordance with a likelihood of the pitch estimated in step Sc4 of the reference-data-generation process Sc.

The manipulation image 75 in FIG. 16 is an image that is responsive to an instruction from the user U to adjust a performance speed of the automatic performance. The user U manipulates the manipulation image 75 to adjust the performance speed of the automatic performance. The performance speed of the automatic performance is indicated by a ratio of the performance speed to a reference speed (that is, a relative value). The reproduction controller 32 controls the automatic performance executed by the performance device 50 in accordance with the performance speed based on a numerical value indicated by the user U such that the reproduction position Y follows the play position X.

E: Modifications

Specific modifications supplementary to the above embodiments are described below. Two or more modes selected from the following descriptions may be combined with one another in so far as no contradiction arises from such a combination.

(1) In each embodiment described above, the instruction receiver 33 receives the manipulation of shifting the manipulation device 14 from the released state to the depressed state as the first instruction Q1. However, a mode of the first instruction Q1 is not limited to the example described above. For example, another motion performed by the user U may be received as the first instruction Q1. To receive the motion performed by the user U, various types of detectors may be used such as a camera, an accelerometer and so forth. The instruction receiver 33 may determine, as the first instruction Q1, various motions such as a motion of the user U in raising one hand, a motion of elevating the musical instrument 200, and a breathing motion (for example, an inhaling motion). Breathing of the user U is a breath (intake of breath) taken when a wind instrument is played as the musical instrument 200. The manipulation velocity V1 in the second embodiment is comprehensively represented as a velocity of a motion of the user U determined as the first instruction Q1.

Specific data denoting the first instruction Q1 (hereinafter, “first data”) may be included in the performance data D. The first data is, for example, a rest fermata symbol included in the piece of music. The instruction receiver 33 determines that the first instruction Q1 is provided when the reproduction position Y reaches a time point of the first data. As will be understood from the above explanation, the first instruction Q1 is not limited to an instruction received from the user U. When the degree of scatter Δ is greater than the threshold Δth in the editing process Sb, the editing processor 34 may add the first data to the note N1.

(2) In each embodiment described above, the instruction receiver 33 receives manipulation of shifting the manipulation device 14 from the depressed state to the released state as the second instruction Q2. However, a mode of the second instruction Q2 is not limited to the example described above. For example, the instruction receiver 33 may receive a manipulation of shifting the manipulation device 14 from the released state to the depressed state not only as the first instruction Q1 in the first embodiment but also as the second instruction Q2. In other words, a first manipulation including depressing and release of the movable member 141 may be received as the first instruction Q1, and a second manipulation including depressing and release of the movable member 141 may be received as the second instruction Q2.

A specific motion of the user U may be received as the second instruction Q2. To receive the motion of the user U, various types of detectors may be used such as a camera, an accelerometer and so forth. The instruction receiver 33 may determine, as the second instruction Q2, various motions such as a motion of the user U in lowering one hand, a motion to lower the musical instrument 200, or a breathing motion (for example, an exhaling motion). Breathing of the user U is a breath (intake of breath) taken when a wind instrument is played as the musical instrument 200. The manipulation velocity V2 in the second embodiment is comprehensively represented as a velocity of a motion of the user U determined as the second instruction Q2.

Specific data denoting the second instruction Q2 (hereinafter, “second data”) may be included in the performance data D. The second data is, for example, a rest fermata symbol included in the piece of music. The instruction receiver 33 determines that the second instruction Q2 is provided when the reproduction position Y reaches a time point of the second data. As will be understood from the above explanation, the second instruction Q2 is not limited to an instruction from the user U.

As described in the examples described above, a configuration is assumed such that one of a pair of two manipulations by the user U is received as the first instruction Q1 and the other of the pair is received as the second instruction Q2. For example, a motion of the user U in raising one hand is received as the first instruction Q1, and a subsequent motion of lowering one hand is received as the second instruction Q2. Alternatively, a motion of the user U to elevate the musical instrument 200 is received as the first instruction Q1, and a subsequent motion to lower the musical instrument 200 is received as the second instruction Q2. An inhaling motion of the user U may be received as the first instruction Q1, and a subsequent exhaling motion may be received as the second instruction Q2.

The type of motion of the user U received as the first instruction Q1 may be different from the type of motion of the user U received as the second instruction Q2. In other words, separate motions that can be performed independently by the user U may be respectively received as the first instruction Q1 and the second instruction Q2. For example, the instruction receiver 33 may receive a manipulation received by the manipulation device 14 as the first instruction Q1, and may receive another motion such as elevation of the musical instrument 200 or the breathing motion as the second instruction Q2.

(3) In each embodiment described above, automatic performance musical instrument is shown as one example of the reproduction device 20. However, the reproduction device 20 is not limited to the example described above. For example, the reproduction device 20 may be a sound source system including both a sound generator that generates an audio signal of musical sounds in response to an instruction from the reproduction control system 10, and a sound emitter that reproduces the musical sounds represented by the audio signal. The sound generator may be realized as a hardware sound source or a software sound source. The performance device 50 in the fifth embodiment is not limited to the examples described above. The performance device 50 in the fifth embodiment may be the sound source system.

(4) In each embodiment described above, the reproduction device 20 is controlled in accordance with the performance data D representative of the series of notes in the piece of music. However, the format of data for controlling the reproduction device 20 is not limited to the example described above. For example, waveform data representative of a plurality of respective sound waveforms of the sounds of the reproduction part may be used to control the reproduction device 20. The waveform data may represent a series of samples. The reproduction controller 32 successively supplies to the reproduction device 20 a sample corresponding to the reproduction position Y from among the series of samples. The reproduction device 20 is a sound emission system that reproduces the sounds represented by the series of the samples supplied from the reproduction control system 10.

The waveform data includes sounding point data representative of a starting point of each sound of the series of sounds (hereinafter, "sounding point"). When the instruction receiver 33 receives the first instruction Q1, the reproduction controller 32 causes the reproduction device 20 to reproduce the sound represented by the waveform data until a time point immediately prior to a sounding point located immediately after a time point of the provision of the first instruction Q1, and waits for the second instruction Q2 after the reproduction. In other words, the reproduction of the sound reproduced at the time of provision of the first instruction Q1 (a first sound) is continued until the end of the first sound. When the instruction receiver 33 receives the second instruction Q2, the reproduction controller 32 causes the reproduction device 20 to reproduce the sound represented by the waveform data (a second sound) from a sounding point immediately after the already reproduced section of the waveform data (the sounding point located immediately after the time point of the provision of the first instruction Q1). In other words, the reproduction of the second sound subsequent to the first sound is started in response to the provision of the second instruction Q2 after stopping the reproduction of the first sound. In the above description, the modifications from the first embodiment to the fourth embodiment including the reproduction device 20 are indicated. However, a format of data for controlling the automatic performance by the performance device 50 in the fifth embodiment is not limited to the format of the performance data D, and may be the waveform data described above.

As will be understood from the above explanation, the performance data D in each embodiment described above and the waveform data in the modification are comprehensively represented as sound data representative of a plurality of sounds and a series of sounds.

(5) The reproduction control system 10 may be realized by a server that communicates with a terminal device such as a smartphone or a tablet terminal. The terminal device includes the sound receiver 13 that generates the audio signal Z in accordance with the playing by the user U and the reproduction device 20 that reproduces the piece of music in response to the instruction from the reproduction control system 10 (or the performance device 50 in the fifth embodiment). The terminal device transmits the audio signal Z generated by the sound receiver 13, with the first instruction Q1, and the second instruction Q2 corresponding to the motion of the user U to the reproduction control system 10 via a communication network. The reproduction control system 10 causes the reproduction device 20 in the terminal device to reproduce the reproduction part of the piece of music in accordance with the play position X estimated based on the audio signal Z, the first instruction Q1, and the second instruction Q2 received from the terminal device. The play analyzer 31 may be installed in the terminal device. The terminal device transmits to the reproduction control system 10 the play position X estimated by the play analyzer 31. In the above configuration, the play analyzer 31 is omitted from the reproduction control system 10.

(6) The functions of the reproduction control system 10 described above may be realized by one or more processors such as the controller 11 working in coordination with the program stored in the storage device 12. The program according to the present disclosure may be provided in a form readable by a computer and stored in a recording medium, and installed in the computer. The recording medium is, for example, a non-transitory recording medium. While an optical recording medium (an optical disk) such as a compact disk read-only memory (CD-ROM) is one example of the recording medium, the recording medium may also include a recording medium of any known form, such as a semiconductor recording medium or a magnetic recording medium. The non-transitory recording medium includes any recording medium except for a transitory, propagating signal and does not exclude a volatile recording medium. The non-transitory recording medium may be a storage apparatus in a distribution apparatus that stores a computer program for distribution via a communication network.

F: Supplemental Notes

The following configurations, for example, are derivable from the embodiments or the modifications described above.

A reproduction control method according to one aspect (a first aspect) of the present disclosure is a method that includes reproducing a series of sounds by using sound data representing the series of sounds. The series of sounds includes a first sound associated with a first instruction and a second sound subsequent to the first sound. The method includes reproducing the first sound, and after stopping reproducing the first sound, starting to reproduce the second sound in response to a second instruction from a user. According to the present aspect, the reproduction of the second sound subsequent to the first sound is started in response to the second instruction from the user after stopping reproducing the first sound. This enables an interval between the first sound and the second sound (for example, a duration of a rest period) to be appropriately controlled in accordance with each of time points of the first instruction and the second instruction.

The "sound data" is data representative of a series of sounds in any format. Thus, "sound data" includes, for example, performance data representative of a sounding period (specifically, producing a sound and muting the sound) for each of notes, or waveform data representative of sound waveforms on a time axis.

The "first instruction" is, for example, an instruction corresponding to a motion of a user, or an instruction added to the sound data. The instruction corresponding to a motion of a user is, for example, an instruction received in response to a manipulation of a manipulation device by the user. The first instruction may be provided in response to a specific motion by the user (for example, a motion to elevate a musical instrument or an intake of breath when playing a wind instrument). The instruction added to the sound data is, for example, any of various performance instructions such as fermata symbol that indicates a note's duration be extended or that a rest be taken.

The "second instruction" is, for example, an instruction corresponding to a motion of a user. The instruction corresponding to the motion of the user is, for example, an instruction received by a manipulation of the manipulation device by the user. The second instruction may be provided in response to a specific motion made by the user (for example, a motion to elevate a musical instrument or an intake of breath when playing a wind instrument).

"Starting to reproduce the second sound in response to the second instruction" means starting to reproduce the second sound responsive to the second instruction; a relationship between the time point of the second instruction and the time point of starting reproduction of the second sound is not taken into account. For example, a mode of "starting to reproduce the second sound responsive to the second instruction" includes a mode in which the reproduction of the second sound is started at the time point of the provision of the second instruction or immediately after the provision of the second instruction, and a mode in which the reproduction of the second sound is started at a time point when a predetermined time has passed since provision of the second instruction.

"Reproduction" of a sound means to emit a sound as a sound wave. The concept of "reproduction" includes, for example, automatic performance in which an automatic performance musical instrument such as an automatic playing piano reproduces sounds, or to emit sounds by way of a configuration that includes both a sound generator and a sound emitter.

In a specific example of the first aspect (a second aspect), the first sound is a sound being reproduced when the first instruction is provided, and the first sound is continued to be reproduced until an end of the first sound represented by the sound data after the provision of the first instruction. According to the present aspect, even after the provision of the first instruction, the reproduction of the first sound is continued until the end of the first sound represented by the sound data. Therefore, the first sound can be appropriately continued in accordance with the sound data, as compared with a configuration in which the reproduction of the first sound stops when the first instruction is provided.

In a specific example of the first aspect (a third aspect), the series of sounds represents a piece of music. A temporal position of a part of the piece of music being played by the user is estimated in conjunction with the reproduction of the series of sounds. In the reproduction of the series of sounds, the reproduction of the series of sounds follows playing of the piece of music by the user in accordance with a result of the estimation. According to the present aspect, the reproduction of the series of sounds follows the playing of the piece of music by the user. Therefore, the intention of the user (for example, the user's musical expression) or the preference of the user can be appropriately reflected in the reproduction of the series of sounds.

In a specific example of any of the first to third aspects (a fourth aspect), the sound data is performance data representative of a sounding period for each sound of the series of sounds. In response to the provision of the first instruction, the first sound is reproduced continuously until an end of the sounding period of the first sound specified by the performance data. According to the present aspect, even after the provision of the first instruction, the reproduction of the first sound is continued until the end of the sounding period of the first sound represented by the performance data. Therefore, the first sound can be appropriately continued over the sounding period represented by the performance data, as compared with a configuration in which the reproduction of the first sound stops at the time of the provision of the first instruction.

In a specific example of any of the first to fourth aspects (a fifth aspect), the first instruction and the second instruction are each generated in accordance with a manipulation of a manipulation device by the user. According to the present aspect, the user can change an interval between the first sound and the second sound to an appropriate time duration in accordance with the intention of the user or the preference of the user.

In a specific example of the fifth aspect (a sixth aspect), the first instruction is generated in response to a manipulation made by the user to shift a state of the manipulation device from a first state to a second state, and the second instruction is generated in response to a manipulation made by the user to shift the state of the manipulation device from the second state to the first state. According to the present aspect, the first instruction is provided by the user to shift the state of the manipulation device from the first state to the second state, and the second state is maintained, and then the second instruction is provided by the user to shift the state of the manipulation device from the second state to the first state at a desired time point. Therefore, compared with a configuration in which two manipulations are required to shift the state of the manipulation device from the first state to the second state so as to generate the first instruction and the second instruction, a manipulation of the manipulation device by the user is simplified.

In a specific example of the fifth or sixth aspect (a seventh aspect), a duration of the first sound is controlled in accordance with a velocity of the manipulation to the manipulation device. According to the present aspect, the user can adjust the duration of the first sound in accordance with the velocity of the manipulation to the manipulation device. Furthermore, the manipulation device for providing the first instruction and the second instruction is also used for adjustment of the duration of the first sound. Therefore, an advantage is obtained in that the user can perform operations with ease as compared with a configuration in which the user operates a device for adjusting the duration of the note N1 in addition to a device for providing the first instruction and the second instruction.

In a specific example of any of the fifth to seventh aspects (an eighth aspect), a time point to start reproducing the second sound is controlled in accordance with a velocity of the manipulation of the manipulation device. According to the present aspect, the user can adjust the starting point of the reproduction of the second sound in accordance with the velocity of the manipulation of the manipulation device. Furthermore, the manipulation device for providing the first instruction and the second instruction is also used for adjustment of the starting point of the second sound. Therefore, an advantage is obtained in that the user can perform operations with ease as compared with a configuration in which the user operates a device for adjusting the starting point of the second sound in addition to a device for providing the first instruction and the second instruction.

A reproduction control method according to one aspect (a ninth aspect) of the present disclosure includes obtaining sound data representative of a series of sounds including a first sound, and continuing to reproduce a first sound that is being reproduced when a first instruction is provided, until an end of the first sound represented by sound data. In the present aspect, even after the provision of the first instruction, the reproduction of the first sound is continued until the end of the first sound represented by the sound data. Therefore, the first sound can be appropriately continued in accordance with the sound data as compared with a configuration in which the reproduction of the first sound stops at the time of the provision of the first instruction.

A reproduction control system according to one aspect (a tenth aspect) of the present disclosure includes a reproduction controller configured to reproduce a series of sounds by using sound data representing the series of sounds. The series of sounds includes a first sound associated with a first instruction and a second sound subsequent to the first sound. The reproduction controller is configured to reproduce the first sound, and to start to reproduce the second in response to a second instruction from a user after stopping reproduction of the first sound. According to the present aspect, after stopping the reproduction of the first sound corresponding to the first instruction, the reproduction of the second sound subsequent to the first sound is started in response to the second instruction from the user. Therefore, an interval between the first sound and the second sound (for example, a duration of a rest period) can be appropriately controlled in accordance with time points each of the first instruction and the second instruction.

A program according to one aspect (an eleventh aspect) of the present disclosure is a program for causing a computer to function as a reproduction controller that is configured to reproduce a series of sounds by use of sound data that represents the series of sounds. The series of sounds includes a first sound associated with a first instruction and a second sound subsequent to the first sound. The reproduction controller is configured to reproduce the first sound, and to start to reproduce the second sound in response to a second instruction from a user after stopping reproduction of the first sound. According to the present aspect, after stopping the reproduction of the first sound corresponding to the first instruction, the reproduction of the second sound subsequent to the first sound is started responsive to the second instruction received from the user. Therefore, an interval between the first sound and the second sound (for example, a duration of a rest period) can be appropriately controlled in accordance with time points each of the first instruction and the second instruction.

It is of note here that reference data for comparison with the playing by the user is required to estimate the time point (a play position, that is a temporal position) of a part being played by the user within the piece of music. However, reference data for a piece of music may not have been prepared.

Therefore, a reproduction control system according to one aspect (a 12th aspect) of the present disclosure includes: a memory for storing instructions; and, at least one processor that implements the instructions to: acquire performance data specifying a plurality of sounds indicated to a performance device; acquire a first audio signal representative of first sounds of a piece of music produced by a musical instrument in a first performance of the piece of music with the musical instrument; generate, based on the first audio signal, reference data representative of a time point at which each of the first sounds of the piece of music is produced in the first performance; compare the reference data with a second audio signal, which represents second sounds of the piece of music produced by the musical instrument in a second performance of the piece of music with the musical instrument, to estimate a temporal position of a performance within the piece of music, the estimation being performed in conjunction with the second performance; and reproduce the plurality of sounds specified by the performance data, the reproduction including reproducing the plurality of sounds so as to follow the second play based on a result of the estimation. According to the aspect, the reference data representative of the time point at which each of the first sounds of the piece of music is produced in the first performance is generated based on the first audio signal representative of the first sounds of the piece of music produced by the musical instrument in the first performance of the piece of music with the musical instrument. Therefore, the reference data for the piece of music does not need to be prepared in advance.

In a specific example of the 12th (a 13th aspect), the plurality of sounds includes a first sound and a second sound subsequent to the first sound. In reproducing the plurality of sounds, the at least one processor is configured to: continue to reproduce the first sound until an end of the first sound represented by the performance data, the first sound being reproduced at a time of provision of a first instruction; and start to reproduce the second sound in response to a second instruction from a user after stopping reproducing the first sound. According to the aspect, the reproduction of the second sound subsequent to the first sound is started in response to the second instruction from the user after stopping reproducing the first sound. This enables an interval between the first sound and the second sound (for example, a duration of a rest period) to be appropriately controlled in accordance with each of time points of the first instruction and the second instruction.

DESCRIPTION OF REFERENCE SIGNS

100 . . . reproduction system, 200 . . . musical instrument, 10 . . . reproduction control system, 11 . . . controller, 12 . . . storage device, 13 . . . sound receiver, 14 . . . manipulation device, 141 . . . movable member, 20 . . . reproduction device, 21 . . . driving mechanism, 22 . . . sound emitting mechanism, 31 . . . play analyzer, 32 . . . reproduction controller, 33 . . . instruction receiver, 34 . . . editing processor, 41 . . . first recorder,

What is claimed is:

1. A computer-implemented reproduction control method of reproducing sound from sound data representing a series of sounds including first sound and second sound that follows the first sound, the method comprising:

starting reproduction of the first sound;

continuing the reproduction of the first sound until an end of the first sound;

in response to receiving a first instruction provided by a user in a reproduction period of the first sound, preventing reproduction of the second sound from a point in time at which the reproduction of the first sound ends until a point in time at which a second instruction provided by the user is received; and starting the reproduction of the second sound in response to receiving the second instruction provided by the user, wherein the first instruction and the second instruction are each generated in accordance with a manipulation of a pedal-type Musical Instrument Digital Interface (MIDI) controller by the user, wherein the sound data is performance data representing a sounding period for each sound of the series of sounds to be reproduced, and wherein the first sound is reproduced continuously until the end of the first sound, the reproduction period of the first sound being specified by the performance data.

2. The reproduction control method according to claim 1, wherein:

the first instruction is generated in response to a manipulation by the user to shift a state of the pedal-type MIDI controller from a first state to a second state; and the second instruction is generated in response to a manipulation by the user to shift the state of the pedal-type MIDI controller from the second state to the first state.

3. The reproduction control method according to claim 1, further comprising controlling a duration of the first sound in accordance with a velocity of the manipulation of the pedal-type MIDI controller.

4. The reproduction control method according to claim 1, further comprising controlling a time point to start the reproduction of the second sound in accordance with a velocity of the manipulation of the pedal-type MIDI controller.

5. The reproduction control method according to claim 1, wherein:

the sound data is included in music data representing a series of notes constituting a piece of music, the music data includes:

reference data representing a series of notes to be played by a user; and the performance data, which represents a series of notes corresponding to the sounds to be played by a reproduction device.

6. The reproduction control method according to claim 5, wherein each of the reference data and the performance data is a series of pieces of data in a MIDI format.

7. A computer-implemented reproduction control method of reproducing a series of sounds, including first sound and second sound that follows the first sound, of a piece of music represented by sound data, the method comprising:

estimating a temporal position of part of the piece of music being played by a user in conjunction with reproduction of the series of sounds of the piece of music being reproduced; and reproducing the series of sounds following playing of the piece of music by the user based on a result of the estimation, wherein the reproducing of the series of sounds includes:

starting reproduction of the first sound;

continuing the reproduction of the first sound until an end of the first sound;

in response to receiving a first instruction provided by a user in a reproduction period of the first sound, preventing reproduction of the second sound from a point in time at which the reproduction of the first sound ends until a point in time at which a second instruction provided by the user is received; and starting the reproduction of the second sound in response to receiving the second instruction provided by the user, wherein the first instruction and the second instruction are each generated in accordance with a manipulation of a pedal-type Musical Instrument Digital Interface (MIDI) controller by the user, wherein the sound data is performance data representing a sounding period for each sound of the series of sounds to be reproduced, and wherein the first sound is reproduced continuously until the end of the first sound, the reproduction period of the first sound being specified by the performance data.

8. A computer-implemented reproduction control method comprising:

obtaining sound data representing a series of sounds including first sound and second sound that follows the first sound;

starting reproduction of the first sound;

continuing the reproduction of the first sound until an end of the first sound;

in response to receiving a first instruction provided by a user in a reproduction period of the first sound, preventing reproduction of the second sound from a point in time at which the reproduction of the first sound ends until a point in time at which a second instruction provided by the user is received; and starting the reproduction of the second sound in response to receiving the second instruction provided by the user, wherein the first and second instructions are each generated in accordance with a manipulation of a pedal-type Musical Instrument Digital Interface (MIDI) controller by the user, wherein the sound data is performance data representing a sounding period for each sound of the series of sounds to be reproduced, and wherein the first sound is reproduced continuously until the end of the first sound, the reproduction period of the first sound being specified by the performance data.

9. A reproduction control system comprising:

a memory storing instructions; and at least one processor that implements the instructions to:

acquire performance data specifying a plurality of sounds, including first sound and second sound following the first sound, provided to a performance device;

acquire a first audio signal representing first music sounds of a piece of music produced by a musical instrument in a first performance of the piece of music with the musical instrument;

generate, based on the first audio signal, reference data representing a time point at which each of the first music sounds of the piece of music is produced in the first performance;

compare the reference data with a second audio signal representing second music sounds of the piece of music produced by the musical instrument in a second performance of the piece of music with the musical instrument, to estimate a temporal position of a performance within the piece of music in conjunction with the second performance; and reproduce the plurality of sounds specified by the performance data, following the second performance based on a result of the estimation, wherein in reproducing the plurality of sounds, the at least one processor is configured to:

start reproduction of the first sound;

continue the reproduction of the first sound until an end of the first sound;

in response to receiving a first instruction provided by a user in a reproduction period of the first sound, prevent reproduction of the second sound from a point in time at which the reproduction of the first sound ends until a point in time at which a second instruction provided by the user is received; and start the reproduction of the second sound in response to receiving the second instruction provided by the user, wherein the first instruction and the second instruction are each generated in accordance with a manipulation of a pedal-type Musical Instrument Digital Interface (MIDI) controller by the user, wherein the performance data represents a sounding period for each sound of the plurality of sounds to be reproduced, and wherein the first sound is reproduced continuously until the end of the first sound, the reproduction period of the first sound being specified by the performance data.

10. A reproduction control apparatus for reproducing sound from sound data representing a series of sounds including first sound and second sound that follows the first sound, the reproduction control apparatus comprising:

a memory storing instructions; and at least one processor that implements the instructions to:

start reproduction of the first sound;

continue the reproduction of the first sound until an end of the first sound;

in response to receiving a first instruction provided by a user in a reproduction period of the first sound, prevent reproduction of the second sound from a point in time at which the reproduction of the first sound ends until a point in time at which a second instruction provided by a user is received; and start the reproduction of the second sound in response to receiving the second instruction provided by the user, wherein the first instruction and the second instruction are each generated in accordance with a manipulation of a pedal-type Musical Instrument Digital Interface (MIDI) controller by the user, wherein the sound data is performance data representing a sounding period for each sound of the series of sounds to be reproduced, and wherein the first sound is reproduced continuously until the end of the first sound, the reproduction period of the first sound being specified by the performance data.

11. The reproduction control apparatus according to claim 10, wherein:

the first instruction is generated in response to a manipulation by the user to shift a state of the pedal-type MIDI controller from a first state to a second state; and the second instruction is generated in response to a manipulation by the user to shift the state of the pedal-type MIDI controller from the second state to the first state.

12. The reproduction control apparatus according to claim 10, wherein the at least one processor is further configured to control a duration of the first sound in accordance with a velocity of the manipulation of the pedal-type MIDI controller.

13. The reproduction control apparatus according to claim 10, wherein the at least one processor is further configured to control a time point to start the reproduction of the second sound in accordance with a velocity of the manipulation of the pedal-type MIDI controller.

14. A reproduction control apparatus for reproducing a series of sounds, including first sound and second sound that follows the first sound, of a piece of music represented by sound data, the reproduction control apparatus comprising:

a memory storing instructions; and at least one processor that implements the instructions to:

estimate a temporal position of part of the piece of music being played by a user in conjunction with reproduction of the series of sounds of the piece of music being reproduced; and reproduce the series of sounds following playing of the piece of music by the user based on a result of the estimation, wherein, in reproducing the series of sounds, the at least one processor is configured to:

start reproduction of the first sound;

continue the reproduction of the first sound until an end of the first sound;

in response to receiving a first instruction provided by a user in a reproduction period of the first sound, preventing reproduction of the second sound from a point in time at which the reproduction of the first sound ends until a point in time at which a second instruction provided by the user is received; and start the reproduction of the second sound in response to receiving the second instruction provided by the user, wherein the first instruction and the second instruction are each generated in accordance with a manipulation of a pedal-type Musical Instrument Digital Interface (MIDI) controller by the user, wherein the sound data is performance data representing a sounding period for each sound of the series of sounds to be reproduced, and wherein the first sound is reproduced continuously until the end of the first sound, the reproduction period of the first sound being specified by the performance data.

* * * * *